(12) United States Patent
Kuribayashi et al.

(10) Patent No.: US 9,076,245 B2
(45) Date of Patent: Jul. 7, 2015

(54) IMAGE DISPLAY APPARATUS AND IMAGING APPARATUS

(75) Inventors: Hidenori Kuribayashi, Tokyo (JP); Masaki Ohtsuki, Yokohama (JP); Kenzo Chiaki, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 388 days.

(21) Appl. No.: 13/220,218

(22) Filed: Aug. 29, 2011

(65) Prior Publication Data

US 2012/0069002 A1 Mar. 22, 2012

(30) Foreign Application Priority Data

Sep. 22, 2010 (JP) ................................. 2010-211704
Aug. 23, 2011 (JP) ................................. 2011-181618

(51) Int. Cl.
*G06T 19/00* (2011.01)

(52) U.S. Cl.
CPC ...................................... *G06T 19/00* (2013.01)

(58) Field of Classification Search
None
See application file for complete search history.

(56) References Cited

U.S. PATENT DOCUMENTS

| | | | |
|---|---|---|---|
| 6,752,498 B2 * | 6/2004 | Covannon et al. ............. 351/240 |
| 6,856,341 B2 * | 2/2005 | Suzuki ............................ 348/51 |
| 7,680,322 B2 | 3/2010 | Tooyama et al. | |
| 8,345,751 B2 * | 1/2013 | Klein Gunnewiek et al. ........................ 375/240.08 |
| 8,368,687 B2 * | 2/2013 | Iwano ............................ 345/419 |
| 8,378,985 B2 * | 2/2013 | Thorn et al. ................... 345/173 |
| 8,717,423 B2 * | 5/2014 | Vesely et al. ..................... 348/51 |
| 2005/0154798 A1 * | 7/2005 | Nurmi ................................. 710/1 |
| 2006/0001650 A1 * | 1/2006 | Robbins et al. ................ 345/173 |
| 2007/0035619 A1 * | 2/2007 | Yoon ................................ 348/47 |
| 2007/0242068 A1 * | 10/2007 | Han et al. ....................... 345/427 |
| 2009/0085831 A1 * | 4/2009 | Odoi et al. ...................... 345/1.3 |
| 2009/0303231 A1 * | 12/2009 | Robinet et al. ................ 345/419 |
| 2010/0033479 A1 * | 2/2010 | Hirayama et al. ............. 345/419 |
| 2010/0234094 A1 * | 9/2010 | Gagner et al. ................... 463/20 |
| 2011/0119579 A1 * | 5/2011 | Huang et al. .................. 715/702 |
| 2011/0164029 A1 * | 7/2011 | King et al. ..................... 345/419 |
| 2011/0221750 A1 | 9/2011 | Sato et al. | |
| 2011/0267437 A1 * | 11/2011 | Abeloe ........................... 348/51 |
| 2013/0201303 A1 * | 8/2013 | Shimotani et al. .............. 348/51 |

FOREIGN PATENT DOCUMENTS

| | | |
|---|---|---|
| JP | A-11-155155 | 6/1999 |
| JP | A-2003-223095 | 8/2003 |
| JP | A-2004-221700 | 8/2004 |

(Continued)

OTHER PUBLICATIONS

English Machine translation of Momose et al. (JP 2003-223095 A), Publication Aug. 8, 2003.*
English Machine translation part of Toru et al. (JP 11-155155), Publication Aug. 6, 1999.*

(Continued)

*Primary Examiner* — Dave Czekaj
*Assistant Examiner* — Mohammad J Rahman
(74) *Attorney, Agent, or Firm* — Oliff PLC

(57) ABSTRACT

An image display apparatus includes a display unit capable of performing a stereoscopic view display of a first image utilizing a disparity of human being, an image processing unit performing processing which changes a depth range in the stereoscopic view display on the first image, and a display controlling unit making the display unit to display the first image on which the processing is performed.

32 Claims, 25 Drawing Sheets

(56) References Cited

FOREIGN PATENT DOCUMENTS

| JP | B2-3579683 | 10/2004 |
| JP | A-2006-211453 | 8/2006 |
| JP | A-2006-267456 | 10/2006 |
| JP | A-2006-293106 | 10/2006 |
| JP | A-2010-183154 | 8/2010 |
| WO | WO 2010/061689 A1 | 6/2010 |

OTHER PUBLICATIONS

English Machine translation part of Mori (JP 2006-267456), Publication May 10, 2006.*
Aug. 14, 2012 Notification of Reasons for Refusal issued in Japanese Patent Application No. 2011-181618 (with translation).
Jul. 22, 2014 Office Action issued in Chinese Patent Application No. 201110291048.9 (with translation).

* cited by examiner

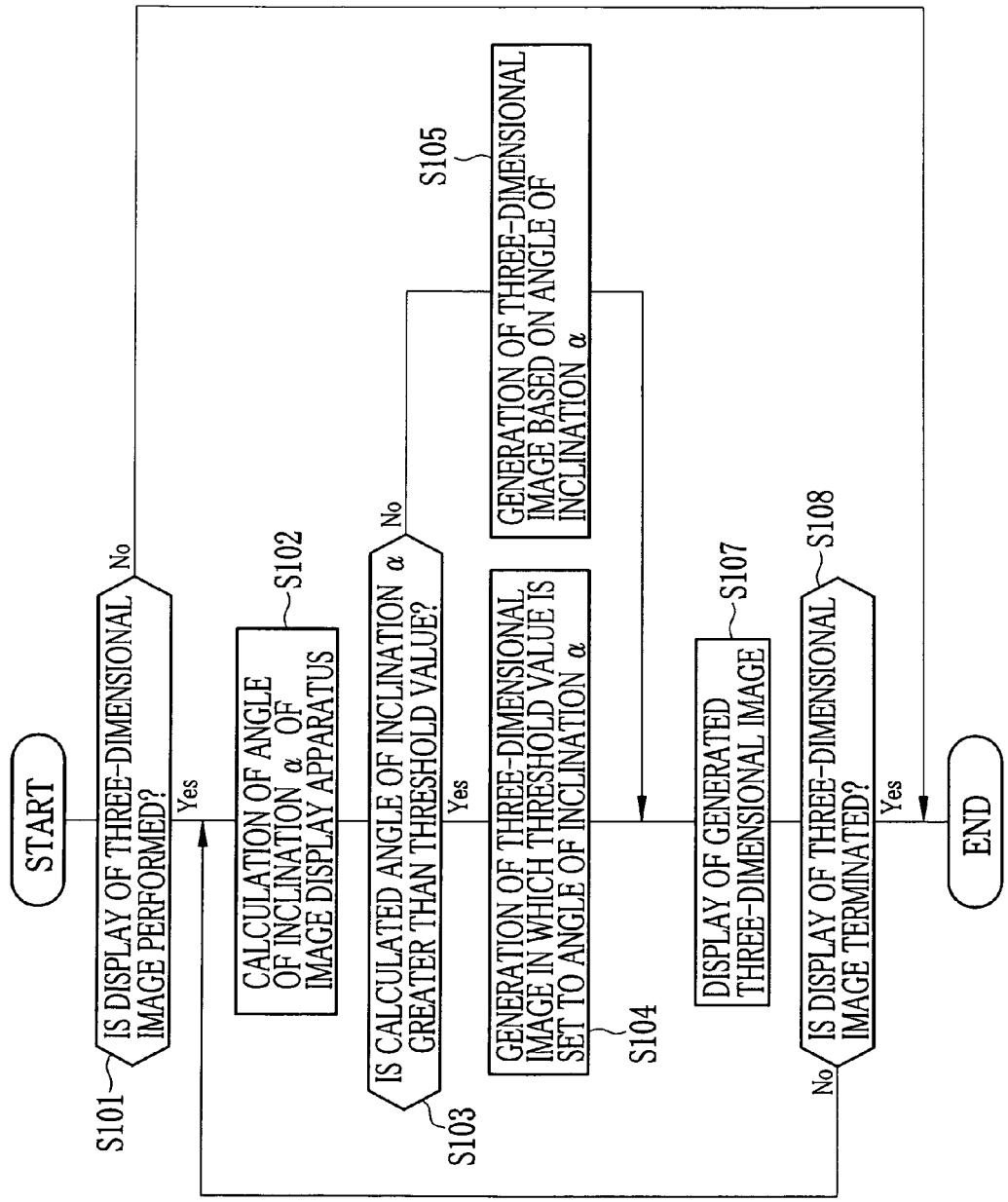

Fig.13A
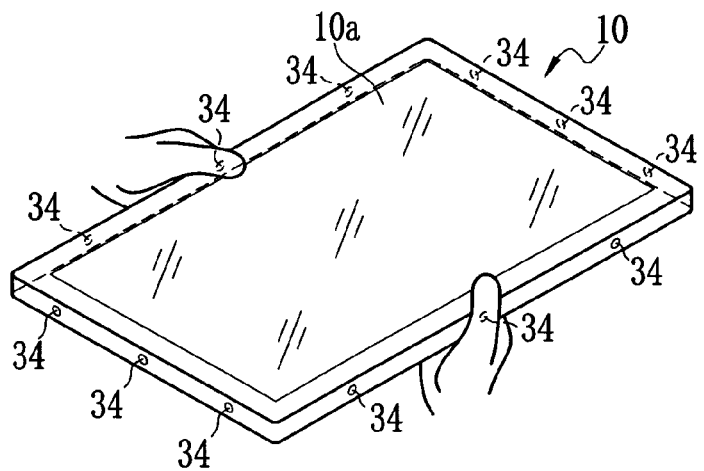
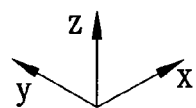
Fig.13B
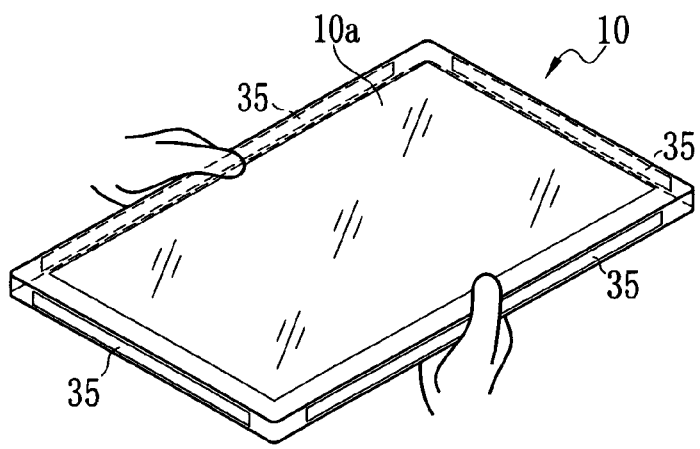
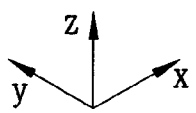

Fig.14A
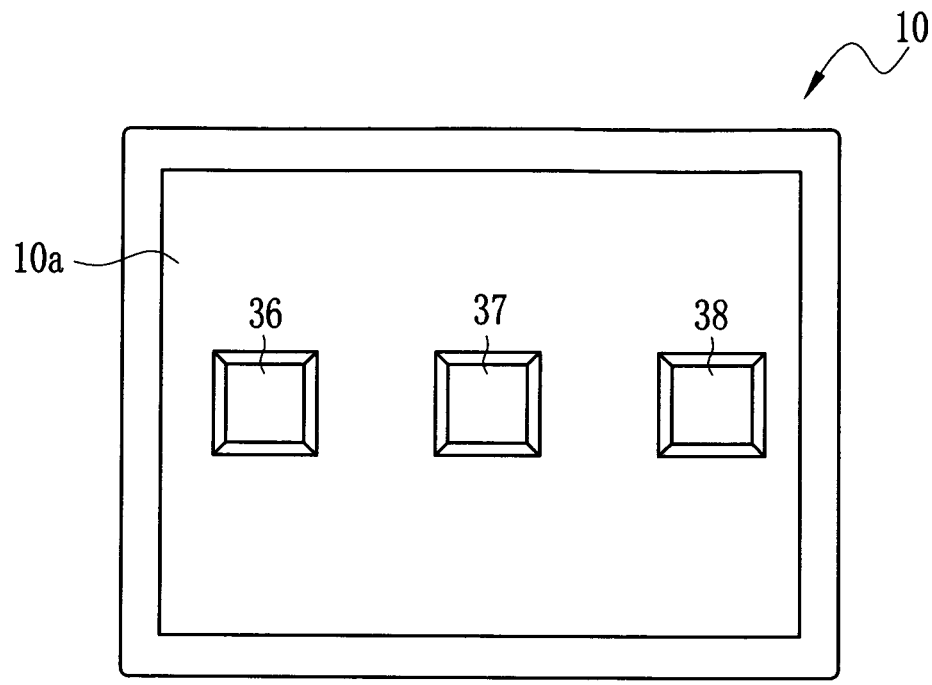
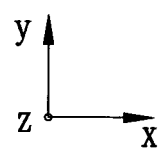
Fig.14B
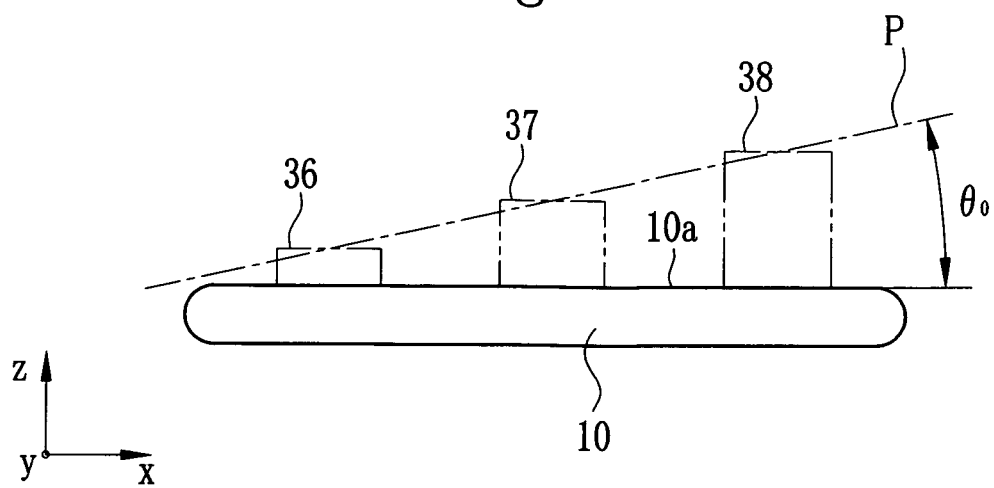
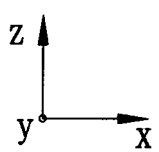

IMAGE DISPLAY APPARATUS AND IMAGING APPARATUS

CROSS REFERENCE TO THE RELATED APPLICATIONS

This application is based upon and claims the benefit of priorities from Japanese Patent Application No. 2010-211704 and Japanese Patent Application No. 2011-181618, filed on Sep. 22, 2010 and Aug. 23, 2011, respectively, the entire contents of which are incorporated herein by reference.

BACKGROUND

1. Field

The present application relates to an image display apparatus and an imaging apparatus capable of performing stereoscopic view display of an image.

2. Description of the Related Art

In recent years, there have been proposed various technologies for performing a stereoscopic view display of images. An image on which the stereoscopic view display is based (referred to as three-dimensional image, hereinafter) is generated by synthesizing a pair of images obtained through shooting utilizing a disparity of human being, or a pair of images generated from an image which is viewed in a planar manner (referred to as two-dimensional image, hereinafter). When positions of eyes of human being coincide with positions at which the pair of images are shot, the stereoscopic view display of the three-dimensional image can be observed in an optimum state, and further, it is possible to feel a sense of depth in the stereoscopic view display. To enable such a stereoscopic view display to be observed in an optimum state, there has been proposed a technology for automatically adjusting an inclination of image display apparatus in accordance with a detected position of person (refer to Japanese Unexamined Patent Application Publication No. 2006-211453, for instance).

However, in Japanese Unexamined Patent Application Publication No. 2006-211453, since there is provided a mechanism for automatically adjusting the inclination of image display apparatus, the image display apparatus becomes large in size. Further, with such a mechanism, it is difficult to adjust the inclination of image display apparatus in accordance with a subtle change of a user's posture, and thus it is difficult to observe the stereoscopic view display of images in an optimum state. Further, when a stereoscopic view display of an image is performed in an image display apparatus, a part of a user's body such as a hand and a finger is sometimes put on a perceptive aspect of the stereoscopic view display or positioned on a far side of the perceptive aspect. In such cases, a stereoscopic effect of an object in the stereoscopic view display is lost, which results in performing the stereoscopic view display that gives a sense of incompatibility.

SUMMARY

The present application has a proposition to provide an image display apparatus and an imaging apparatus which enable to observe a stereoscopic view display of an image with a simple configuration and in an optimum state.

In order to solve the aforementioned problems, an image display apparatus of the present embodiment includes a display unit capable of performing a stereoscopic view display of a first image utilizing a disparity of human being, an image processing unit performing processing which changes a depth range in the stereoscopic view display on the first image, and a display controlling unit making the display unit to display the first image on which the processing is performed.

Further, there provided an inclination detecting unit detecting an inclination of the apparatus, in which the image processing unit performs the processing on the first image based on the inclination of the apparatus detected by the inclination detecting unit.

Further, there provided an operating unit being operated at a time of changing the depth range, in which the image processing unit performs the processing on the first image based on the operation of the operating unit. In this case, it is preferable to include a storage unit storing the depth range being changed through the operation of the operating unit, in which the image processing unit performs the processing on the first image in order for the depth range in the stereoscopic view display to become the depth range stored in the storage unit.

Further, an aspect by which the first image is perceived in the stereoscopic view display is inclined by a predetermined angle with respect to a display surface of the display unit, and the predetermined angle is changed by performing the processing by the image processing unit. In this case, it is preferable that the aspect by which the first image is perceived in the stereoscopic view display to become the display surface of the display unit when a binocular disparity amount of human being who observes the first image is out of a range of fusional limit in the stereoscopic view display. Further, it is preferable that the aspect by which the first image is perceived in the stereoscopic view display to become the display surface of the display unit when the predetermined angle exceeds a previously set threshold value.

Further, the image processing unit sets, based on a position at which a person touches, the aspect by which the first image is perceived as a position of rotation center used when making to incline by the predetermined angle. In this case, the image processing unit sets, when the person is touched at a plurality of positions at a same time, a straight line passing through an intermediate position of the plurality of positions as the rotation center used when making the aspect by which the first image is perceived to incline by the predetermined angle. Further, other than this, the image processing unit sets, when the person is touched at a plurality of positions at a same time, a straight line passing through any position out of the plurality of positions as the rotation center used when making the aspect by which the first image is perceived to incline by the predetermined angle.

Further, there provided a position detecting unit detecting a position at which a person touched in the display surface, in which the image processing unit reduces the first image based on the position of the person detected by the position detecting unit, and the display unit displays the first image being reduced by the image processing unit.

Further, the image processing unit adjusts a width of the first image based on the changed depth range.

Further, the first image is displayed using an entire area of the display unit.

Further, the first image is displayed using a part of area of the display unit.

Further, the image processing unit changes a depth range of a construction included in the first image by performing the processing on an area of a construction included in the first image.

Further, the image processing unit performs, when an area with which an input operation is performed is included in the first image, the processing on at least an area other than the area with which the input operation is performed.

Further, the image processing unit changes, when a construction being displayed in the stereoscopic view display is included in the first image, the depth range in the first image while maintaining a depth range in the construction by performing the processing on an area other than an area of the construction.

Further, there provided a detecting unit detecting a touch of a person, in which the image processing unit performs the processing on the first image based on presence/absence of the touch of the person detected by the detecting unit. In this case, it is preferable for the display controlling unit to stop the display of the first image by the display unit when the touch of the person cannot be detected by the detecting unit.

Further, there provided an imaging unit capturing a second image which is different from the first image, in which the image processing unit performs the processing on the first image based on a position of a face of a person included in the second image captured by the imaging unit. In this case, it is preferable for the display controlling unit to stop the display of the first image by the display unit when the face of the person cannot be detected from the second image captured by the imaging unit.

Further, the imaging unit can obtain the second image in which an aspect by which the first image is perceived in the stereoscopic view display is set as a shooting range, and it is preferable to include a determining unit determining whether or not the operating unit is operated based on a position of a hand of the person included in the second image captured by the imaging unit and a position of an operating unit included in the stereoscopic view display, and a controlling unit performing, when the determining unit determines that the operating unit is operated, control based on the operation of the operating unit.

In this case, it is preferable for the shooting range in the imaging unit to be formed of an area which projects forward than a display surface of the display unit among the aspect by which the first image is perceived in the stereoscopic view display.

Further, it is preferable to include a touch screen with which an input operation is performed, and a sensitivity changing unit changing detection sensitivity in the touch screen based on the depth range in the stereoscopic view display being changed by the image processing unit.

Further, there provided a blower module blowing wind toward an object by which the input operation is performed or a jetting module jetting drops of water toward the object by which the input operation is performed when the performance of the input operation through the touch screen is detected.

Further, there provided a height detecting unit detecting a height at which the apparatus is positioned, in which the image processing unit performs the processing on the first image based on the height at which the apparatus is positioned detected by the height detecting unit.

Further, there further provided an obstruction detecting unit detecting an obstruction positioned in front of the display unit, and a calculating unit calculating a distance from the display unit to the obstruction based on the detection of the obstruction by the obstruction detecting unit, in which the image processing unit changes the depth range in the first image when the distance calculated by the calculating unit becomes equal to or less than the depth range in the first image.

In this case, the calculating unit calculates a position of the obstruction on a display surface of the display unit, and the image processing unit changes the depth range in the first image with respect to a construction positioned corresponding to the position of the obstruction.

Further, the image processing unit changes a depth range with respect to the entire first image.

Further, an aspect by which the first image is perceived in the stereoscopic view display is formed of a curved surface or a bending surface in which a depth range in a peripheral edge portion of the display unit is set to be less than a depth range in a center portion of the display unit.

In this case, there provided a detecting unit detecting a touch of a person, in which, when the touch of the person is detected by the detecting unit, a depth range of the aspect by which the first image is perceived in a vicinity of a position at which the touch of the person is detected is set to zero (0).

Further, the depth range in the center portion of the display unit is changed in accordance with a movement of the position of the touch of the person detected by the detecting unit.

Further, an imaging apparatus of the present embodiment includes the image display apparatus in any of the aforementioned description.

According to the present embodiment, it is possible to observe a stereoscopic view display of an image in accordance with an inclination of an image display apparatus with a simple configuration and in an optimum state.

BRIEF DESCRIPTION OF THE DRAWINGS

FIG. 2 is a flow chart illustrating a flow of processing when a three-dimensional image is displayed.

FIG. 13A is a diagram illustrating a case where point sensors are provided on side surfaces of the image display apparatus.

FIG. 13B is a diagram illustrating a case where pressure sensitive sensors are provided on the side surfaces of the image display apparatus.

FIG. 14A is a plan view illustrating an example of disposition of operation buttons displayed on the image display apparatus.

FIG. 14B is a diagram illustrating depth ranges of the respective operation buttons illustrated in FIG. 14A when the respective operation buttons are stereoscopic-view-displayed.

DETAILED DESCRIPTION OF THE EMBODIMENTS

Hereinafter, an image display apparatus of the present embodiment will be described. Note that an image display apparatus 10 in the present embodiment is an image display apparatus which can be hand-held and operated by a user. The image display apparatus 10 is formed of an image display apparatus 10 which can perform a planar view display and a stereoscopic view display of images. Hereinafter, explanation will be made by referring to an image that is planar-view-displayed and an image that is stereoscopic-view-displayed as a two-dimensional image and a three-dimensional image, respectively. Note that a stereoscopic view display of the three-dimensional image utilizes a binocular disparity of a user who performs observation.

Figure 1:
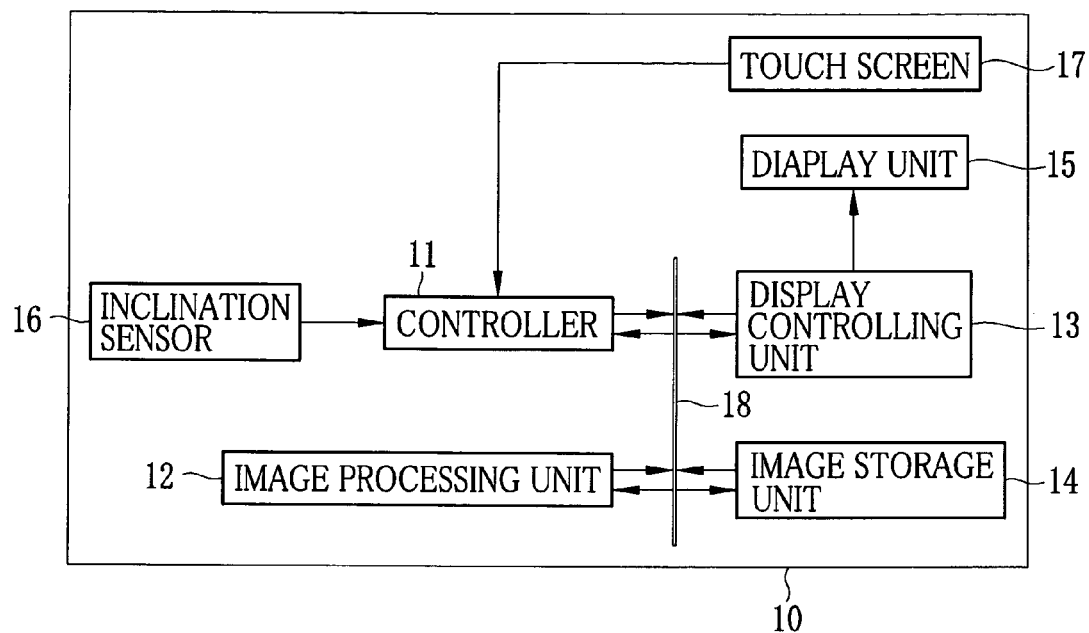
FIG. 1 is a functional block diagram illustrating a configuration of an image display apparatus.

As illustrated in FIG. 1, the image display apparatus 10 is formed of a controller 11, an image processing unit 12, a display controlling unit 13, an image storage unit 14, a display unit 15, an inclination sensor 16, a touch screen 17, and the like. Note that the controller 11, the image processing unit 12, the display controlling unit 13, and the image storage unit 14 are connected via a bus 18. Note that the image display apparatus 10 illustrated in FIG. 1 is an example for explaining the present embodiment, and it is also possible to use an image display apparatus to/from which a memory card, an optical disk, a magnetic disk or the like can be attached/detached, for example.

The controller 11 includes a CPU, a ROM, and a RAM. When the CPU executes a control program stored in the ROM, the controller 11 controls respective parts of the image display apparatus 10. Signals from the inclination sensor 16 and the touch screen 17 are input into the controller 11. Upon receiving the signals from the inclination sensor 16 and the touch screen 17, the controller 11 performs control based on these signals.

The image processing unit 12 generates a three-dimensional image from a two-dimensional image stored in the image storage unit 14. As is well known, a stereoscopic view display of a three-dimensional image can be observed in an optimum state when positions at which an image for left eye (referred to as left-eye image, hereinafter) and an image for right eye (referred to as right-eye image, hereinafter) are shot coincide with positions of a left eye and a right eye of human being. The image processing unit 12 uses an angle of inclination α of the image display apparatus 10 and a binocular disparity amount of human being, thereby generating the left-eye image and the right-eye image, respectively, based on the two-dimensional image read from the image storage unit 14. After generating these images, the image processing unit 12 performs correction processing such as one for removing perspective, on each of the left-eye image and the right-eye image. The correction processing for removing perspective is processing performed for giving an effect of creating a sense of depth equal to or greater than that provided by the binocular disparity of human being (Phantom Chart), when an image as a result of correcting perspective of a background of stereo image shot from a diagonal direction is observed from the same angle as that at the time of performing the shooting. After this processing, the image processing unit 12 synthesizes these images. Through the synthesis of these images, the three-dimensional image is generated.

When the three-dimensional image generated by the image processing unit 12 is displayed, an aspect by which the stereoscopic-view-displayed three-dimensional image is perceived (hereinafter, referred to as perceptive aspect) S is observed in a state of being inclined by an angle $θ_0$ with respect to a display surface 10a of the image display apparatus 10 in a horizontal state, because of the aforementioned effect of Phantom Chart (refer to FIG. 3A). Here, the horizontal state indicates a state where the display surface 10a of the image display apparatus 10 becomes a surface parallel to an xy plane in FIG. 3A. The aforementioned angle $θ_0$ may take a value automatically calculated by the controller 11 or may also take a value previously determined through experiments, statistics and the like.

Note that since the aforementioned method of generating the three-dimensional image from the two-dimensional image and method of performing correction for removing the perspective have been disclosed in Japanese Patent No. 3579683, details thereof will be omitted here.

The display controlling unit 13 performs display control on the display unit 15 by using the three-dimensional image generated by the image processing unit 12, and the two-dimensional image and the three-dimensional image read from the image storage unit 14.

The image storage unit 14 stores one or a plurality of two-dimensional image (images) and three-dimensional image (images). As the image storage unit 14, there can be cited a hard disk embedded in the image display apparatus 10, and an IC memory such as an SRAM and a DRAM.

The display unit 15 displays, other than the two-dimensional image and the three-dimensional image stored in the image storage unit 14, the three-dimensional image generated by the image processing unit 12. Note that as a display method for the display unit 15, it is possible to use an appropriate method as long as it can realize a stereoscopic view display of the three-dimensional image, such as glasses method utilizing anaglyph, polarized glasses, liquid-crystal shutter glasses or the like, and a naked-eye method such as a parallax barrier method and a lenticular lens method.

As the inclination sensor 16, there is used a gyro sensor, for example. The inclination sensor 16 detects whether or not the image display apparatus 10 is inclined. A signal which is output based on the detection of the inclination sensor 16 (referred to as detection signal, hereinafter) is input into the controller 11. The controller 11 calculates an angle of inclination α of the image display apparatus 10 based on the detection signal output from the inclination sensor 16. The angle of inclination α calculated by the controller 11 is output to the image processing unit 12.

The touch screen 17 is disposed on an upper surface of the display unit 15. For the touch screen 17, there is used any one of methods of resistive, infrared, surface acoustic wave, capacitive, and the like. Note that by operating the touch screen 17, a signal based on the operation (referred to as operation signal, hereinafter) is output toward the controller 11. The controller 11 performs control based on the operation signal output from the touch screen 17.

Next, a flow of processing at a time of displaying the three-dimensional image by using the aforementioned image display apparatus 10 will be described with reference to a flow chart in FIG. 2.

Step S101 corresponds to processing for determining whether or not the three-dimensional image is displayed. When the touch screen 17 is operated by a user, the operation signal is output from the touch screen 17 toward the controller 11. Upon receiving the operation signal output from the touch screen 17, the controller 11 performs control based on the operation signal. When the operation signal from the touch screen 17 is a signal indicating that the three-dimensional image is displayed, the controller 11 sets a result of determination processing in step S101 as Yes. In this case, the process proceeds to step S102. On the other hand, when the operation signal from the touch screen 17 is not the signal indicating that the three-dimensional image is displayed, the controller 11 sets the result of determination processing in step S101 as No. In this case, the controller 11 performs processing based on the signal output from the touch screen 17. After these processing are performed, the processing in the flow chart in FIG. 2 is terminated. Note that in the flow chart in FIG. 2, processing when the three-dimensional image is not displayed is omitted.

Step S102 corresponds to processing for calculating the angle of inclination α of the image display apparatus. As described above, the image display apparatus 10 is the image display apparatus 10 which can be hand-held and operated by the user. Namely, the image display apparatus 10 is used in the horizontal state or in a state of being inclined by a predetermined angle α from the horizontal state. The inclination sensor 16 detects whether or not the image display apparatus 10 is inclined, and outputs the detection signal to the controller 11. Upon receiving the detection signal, the controller 11 calculates the angle of inclination α of the image display apparatus 10.

Step 103 corresponds to processing for determining whether or not the calculated angle of inclination α exceeds a threshold value. The controller 11 compares the angle of inclination α calculated in step S102 with the previously set threshold value. For instance, when the calculated angle of inclination α exceeds the threshold value, the controller 11 sets a result of determination processing in step S103 as Yes, and the process proceeds to step S104. On the other hand, when the calculated angle of inclination α becomes equal to or less than the threshold value, the controller 11 sets the result of determination processing in step S103 as No, and the process proceeds to step S105.

Step S104 corresponds to processing for generating a three-dimensional image in which the threshold value is set to the angle of inclination α. In step S103, the controller 11 determines that the angle of inclination α exceeds the threshold value. In this case, the controller 11 sets the threshold value to the angle of inclination α, and outputs the set angle of inclination α to the image processing unit 12. The image processing unit 12 reads the two-dimensional image from the image storage unit 14. Subsequently, the image processing unit 12 generates the three-dimensional image by using the read two-dimensional image, the angle of inclination α, and the binocular disparity amount of human being.

On the other hand, when it is determined that the calculated angle of inclination α is equal to or less than the threshold value in step S103, the process proceeds to step S105.

Step S105 corresponds to processing for generating a three-dimensional image based on the angle of inclination α. The controller 11 outputs the calculated angle of inclination α to the image processing unit 12. The image processing unit 12 reads the two-dimensional image from the image storage unit 14. Subsequently, the image processing unit 12 generates the three-dimensional image by using the read two-dimensional image, the angle of inclination α, and the binocular disparity amount of human being.

Step S106 corresponds to processing for displaying the generated three-dimensional image. By performing the aforementioned processing in step S104 or step S105, the three-dimensional image is generated. The three-dimensional image generated by the image processing unit 12 is output from the image processing unit 12 to the display controlling unit 13. When the display controlling unit 13 outputs the three-dimensional image to the display unit 15, the three-dimensional image is displayed on the display unit 15.

Step S107 corresponds to processing for determining whether or not the display of three-dimensional image is terminated. When the touch screen 17 is operated by the user, the operation signal is output from the touch screen 17 toward the controller 11. When the operation signal from the touch screen 17 is a signal indicating that the display of three-dimensional image is terminated, the controller 11 sets a result of determination in this step S107 as Yes. When this determination is made, the display of three-dimensional image is terminated.

On the other hand, when the operation signal from the touch screen 17 is not the signal indicating that the display of three-dimensional image is terminated, the result of determination in step S107 is set as No, and the process proceeds to step S102. In this case, the processing from step S102 to step S107 is repeated again, and the three-dimensional image is displayed. Note that when the angle of inclination α of the image display apparatus 10 changes at the time of displaying the three-dimensional image, the three-dimensional images in accordance with the changing angle of inclination α are generated, and are sequentially displayed.

Figure 3A:
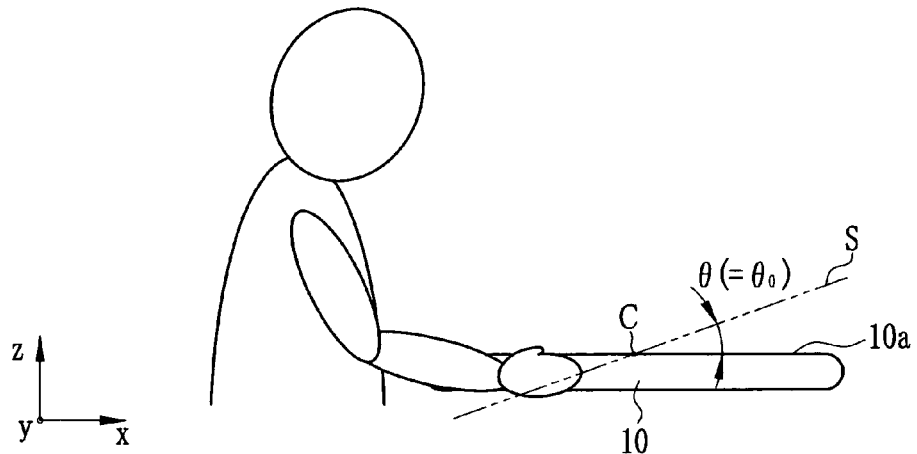
FIG. 3A is a diagram illustrating a case where, in a relation between a display surface of an image display apparatus and a perceptive aspect of a stereoscopic-view-displayed three-dimensional image, the image display apparatus is in a horizontal state.
Figure 3B:
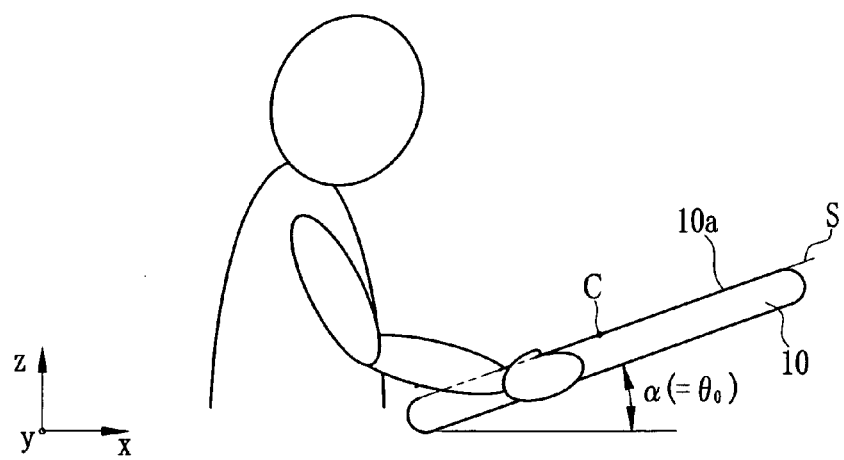
FIG. 3B is a diagram illustrating a case where, in a relation between the display surface of the image display apparatus and the perceptive aspect of the stereoscopic-view-displayed three-dimensional image, the image display apparatus is inclined by an angle $\alpha(=\theta_0)$.
Figure 3C:
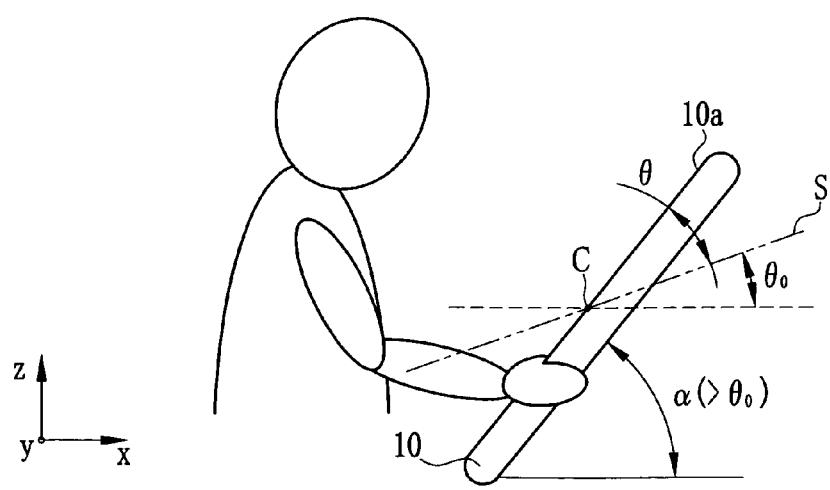
FIG. 3C is a diagram illustrating a case where, in a relation between the display surface of the image display apparatus and the perceptive aspect of the stereoscopic-view-displayed three-dimensional image, the image display apparatus is inclined by an angle $\alpha(>\theta_0)$.

For instance, as illustrated in FIG. 3A, when the image display apparatus 10 is in the horizontal state, the perceptive aspect S of the stereoscopic-view-displayed three-dimensional image is in a state of being inclined by an angle $\theta(=\theta_0)$ with respect to the display surface 10a of the image display apparatus 10. Note that FIG. 3A to FIG. 3C illustrate cases where the perceptive aspect S is inclined by the angle θ in a counterclockwise direction around an axis in the y direction passing through a midpoint C in the x direction of the display surface 10a as a rotation center. In this case, the perceptive aspect S is observed such that an area from an end portion on the user side to the midpoint C in the x direction of the display surface 10a is positioned rearward of the display surface 10a, and further, an area from the midpoint C of the display surface 10a to an end portion being an opposite side of the end portion on the user side is positioned forward of the display surface 10a.

FIG. 3B illustrates a case where the image display apparatus 10 in the horizontal state is inclined by an angle $\alpha(=\theta_0)$. As described above, the perceptive aspect S of the stereoscopic-view-displayed three-dimensional image is in the same plane as the perceptive aspect S of the three-dimensional image which is stereoscopic-view-displayed when the image display apparatus 10 is in the horizontal state, regardless of the angle α by which the image display apparatus 10 is inclined. In other words, in the state of FIG. 3B, the perceptive aspect S is in the same plane as the display surface 10a of the image display apparatus 10.

FIG. 3C illustrates a case where the image display apparatus 10 in the horizontal state is inclined by an angle $\alpha(>\theta_0)$. In this case, the three-dimensional image is generated so that the perceptive aspect S in the stereoscopic view display becomes the perceptive aspect S of the three-dimensional image which is stereoscopic-view-displayed when the image display apparatus 10 is in the horizontal state. In this case, the perceptive aspect S of the three-dimensional image becomes an aspect inclined by an angle $\theta_0$ in the counterclockwise direction with respect to the display surface 10a of the image display apparatus 10 in the horizontal state. Namely, the perceptive aspect S of the three-dimensional image is observed such that the area from the midpoint C in the x direction of the display surface 10a to the end portion on the user side is positioned forward of the display surface 10a, and further, the area from the midpoint C in the x direction of the display surface 10a to the end portion being the opposite side of the end portion on the user side is positioned rearward of the display surface 10a.

As above, the perceptive aspect S of the three-dimensional image which is stereoscopic-view-displayed when the image display apparatus 10 is inclined is generated to be the perceptive aspect S of the three-dimensional image which is stereoscopic-view-displayed when the image display apparatus 10 is in the horizontal state. Namely, by inclining the image display apparatus 10, a depth range in the stereoscopic view display of the three-dimensional image is changed. Accordingly, even when the image display apparatus 10 is accidentally inclined at the time of observing the image using the image display apparatus 10, it becomes possible to observe the stereoscopic view display of the three-dimensional image in an optimum state. Further, since the three-dimensional image to be displayed is generated based on the angle of inclination α of the image display apparatus 10, there is no need to newly provide a mechanism such as one for inclining the display unit in accordance with a position of person who performs observation, and thus it becomes possible to realize the image display apparatus 10 with a configuration of a commonly used image display apparatus.

Figure 4A:
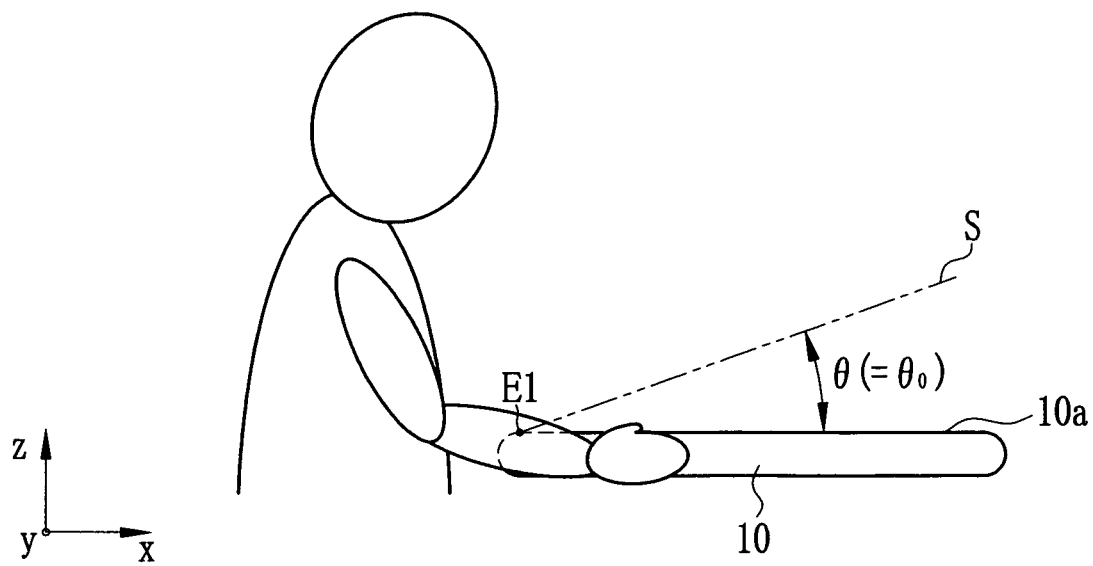
FIG. 4A is a diagram illustrating a case where an end portion on a user side is set as a rotation center of the perceptive aspect.
Figure 4B:
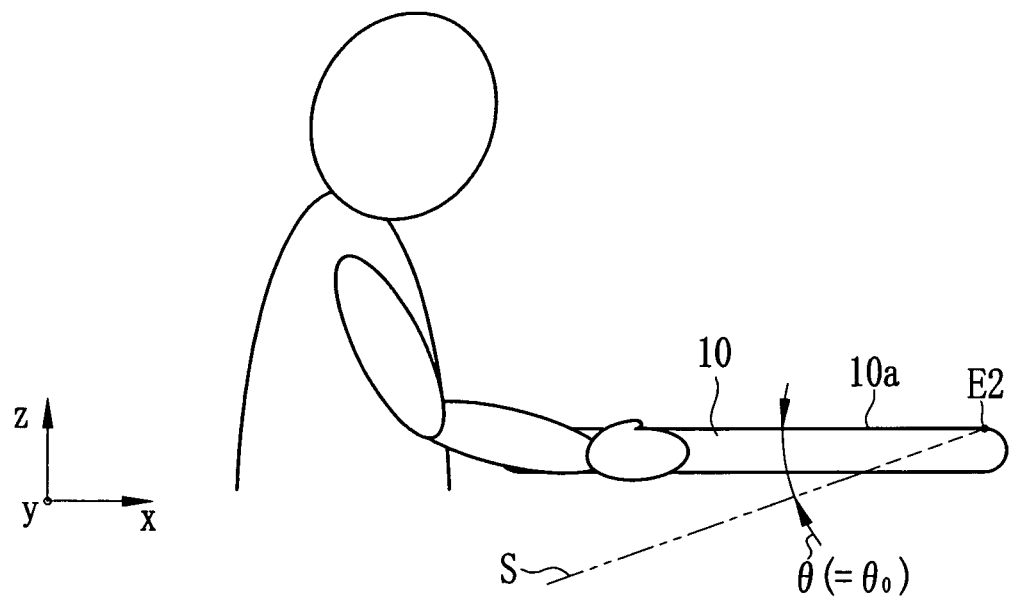
FIG. 4B is a diagram illustrating a case where an end portion being an opposite side of the end portion on the user side is set as the rotation center of the perceptive aspect.

In the present embodiment, the aspect inclined by the angle $\theta_0$ in the counterclockwise direction around the axis in the y direction passing through the midpoint C in the x direction of the display surface 10a as the rotation center, is set as the perceptive aspect S of the stereoscopic-view-displayed three-dimensional image, but, there is no need to limit to this and, as illustrated in FIG. 4A, for example, it is also possible to set an aspect inclined by an angle $\theta_0$ in the counterclockwise direction around an axis in the y direction passing through an end portion E1 on the user side between both end portions in the x direction of the display surface 10a as the rotation center, is set as the perceptive aspect S. Further, as illustrated in FIG. 4B, it is also possible to set an aspect inclined by the angle $\theta_0$ in the counterclockwise direction around an axis in the y direction passing through an end portion E2 being the opposite side of the end portion E1 on the user side between the both end portions in the x direction of the display surface 10a as the rotation center, is set as the perceptive aspect S. Furthermore, it is also possible to set an aspect inclined by the angle $\theta_0$ in the counterclockwise direction around an axis in the y direction passing through an arbitrary position in the x direction of the display surface 10a as the rotation center, is set as the perceptive aspect S.

Here, when the aspect inclined by the angle $\theta_0$ in the counterclockwise direction around the axis in the y direction passing through the arbitrary position in the x direction of the display surface 10a as the rotation center, is set as the perceptive aspect S, it is also possible to decide a position of rotation center based on a position of finger of the user. The user holds the image display apparatus 10 by gripping each of both end portions in the y direction of the image display apparatus 10. At this time, the user's finger of either a left hand or a right hand is sometimes put on the display surface 10a. In such a case, the touch screen 17 detects a position of finger of a left hand L1 or a right hand R1 put on the display surface 10a. The rotation center is decided based on the position of finger of the left hand L1 or the right hand R1 detected by the touch screen 17. Specifically, positional information indicating the detected position is calculated from the detection signal output from the touch screen 17, so that the controller 11 uses the positional information to determine whether or not the position of finger of the left hand L1 and the position of finger of the right hand R1 become the same in the x direction.

Figure 5A:
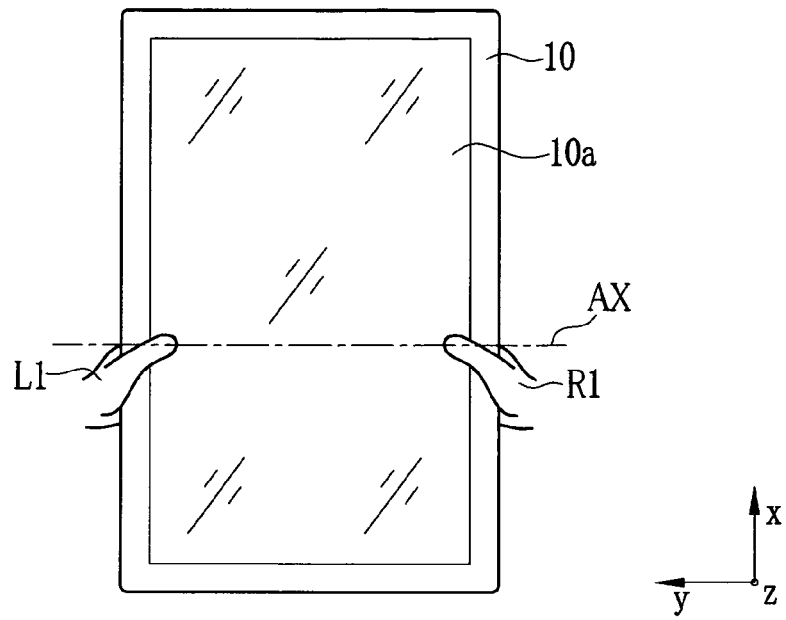
FIG. 5A is a diagram illustrating a position of rotation center when a thumb of a left hand and a thumb of a right hand are at the same position in an x direction.

As illustrated in FIG. 5A, when the position of thumb of the left hand L1 and the position of thumb of the right hand R1 in the x direction are almost the same, a straight line connecting the detected position of thumb of the left hand L1 and position of thumb of the right hand R1, is set as an axis AX of rotation center.

Figure 5B:
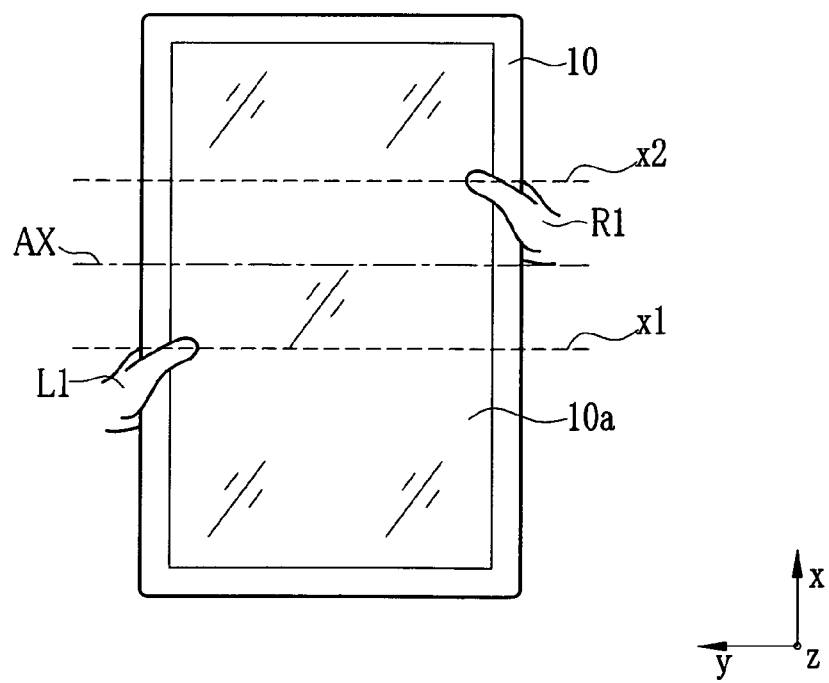
FIG. 5B is a diagram illustrating a position of rotation center when the thumb of the left hand and the thumb of the right hand are at different positions.

Further, as illustrated in FIG. 5B, when the position of thumb of the left hand L1 and the position of thumb of the right hand R1 in the x direction are different, the controller 11 determines that the position of finger of the left hand L1 and the position of finger of the right hand R1 are not the same in the x direction. In this case, the controller 11 determines coordinates of a midpoint between the position of thumb of the left hand L1 (coordinates indicated by a dotted line x1) and the position of thumb of the right hand R1 (coordinates indicated by a dotted line x2) in the x direction. Subsequently, the controller 11 sets a straight line passing through the midpoint as the axis AX of rotation center.

Figure 6:
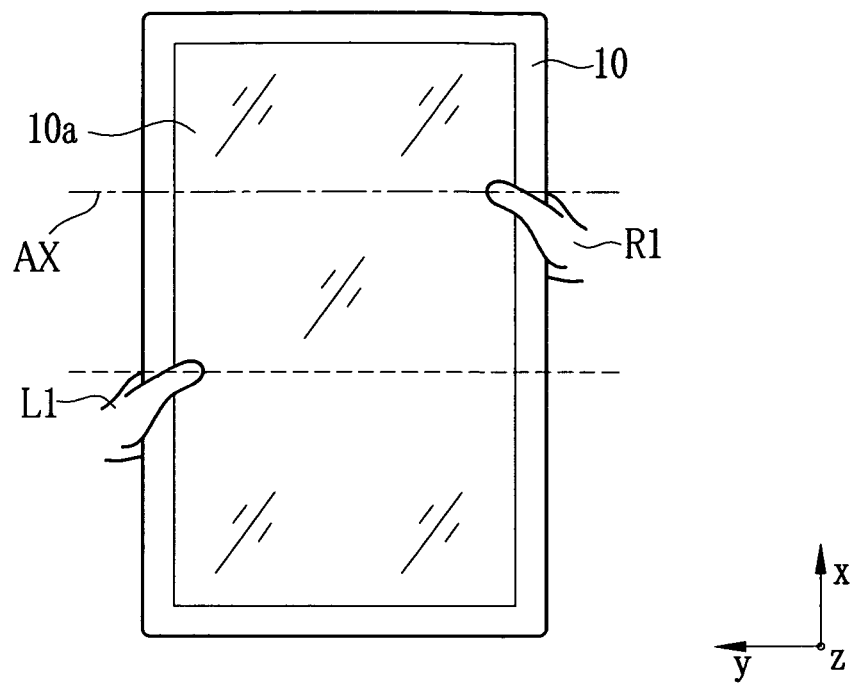
FIG. 6 is a diagram illustrating a position of rotation center when a position of the thumb of the left hand and a position of the thumb of the right hand are different.

Note that when the aspect inclined in the counterclockwise direction in FIG. 3 around the axis in the y direction as the rotation center is set as the perceptive aspect S, it is also possible to set a position of finger positioned apart from a body of human being, as the axis AX of rotation center. Here, in FIG. 6, the position of thumb of the right hand R1 is apart from the body, so that the position of thumb of the right hand R1 in the x direction is set as the axis AX of rotation center. Further, when an aspect inclined in a clockwise direction in FIG. 3 around an axis in the y direction as the rotation center is set as the perceptive aspect S, it is also possible to set a position of finger positioned close to the body of human being as the axis AX of rotation center.

Note that when holding the image display apparatus 10 by using one hand, it is only required that a position of thumb of the hand holding the image display apparatus 10 is detected by the touch screen 17, and then the controller 11 sets the axis AX to be the rotation center based on the detected position of thumb.

In the present embodiment, although the perceptive aspect S of the stereoscopic-view-displayed three-dimensional image is formed as the aspect that is inclined around the axis in the y direction as the rotation center, there is no need to form the perceptive aspect S as the aspect that is inclined around the axis in the y direction as the rotation center, and it is also possible to form the perceptive aspect S as an aspect that is inclined around an axis in the x direction as the rotation center or an aspect that is inclined around an axis in the x direction and an axis in the y direction, respectively, as the rotation center.

Figure 7A:
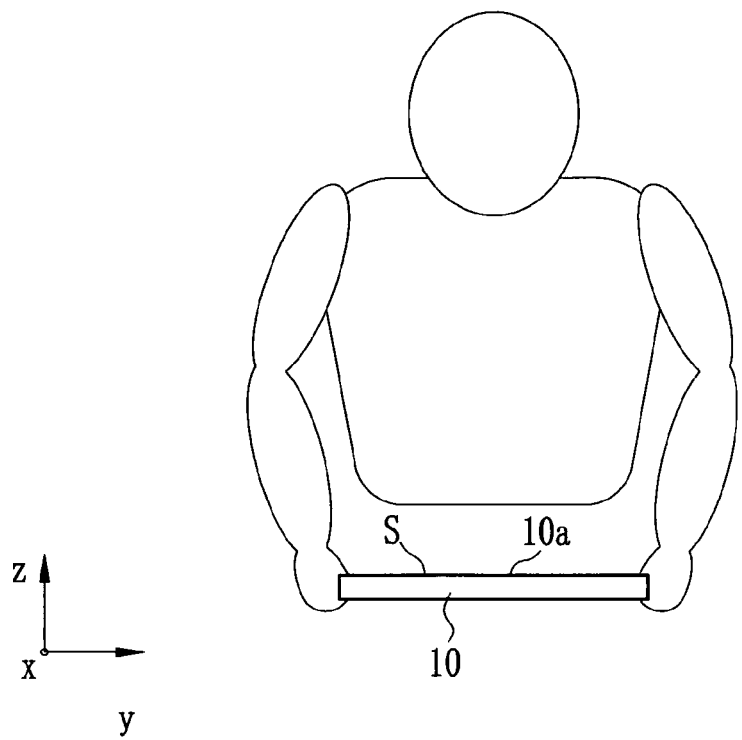
FIG. 7A is a diagram illustrating the image display apparatus which is held horizontally.
Figure 7B:
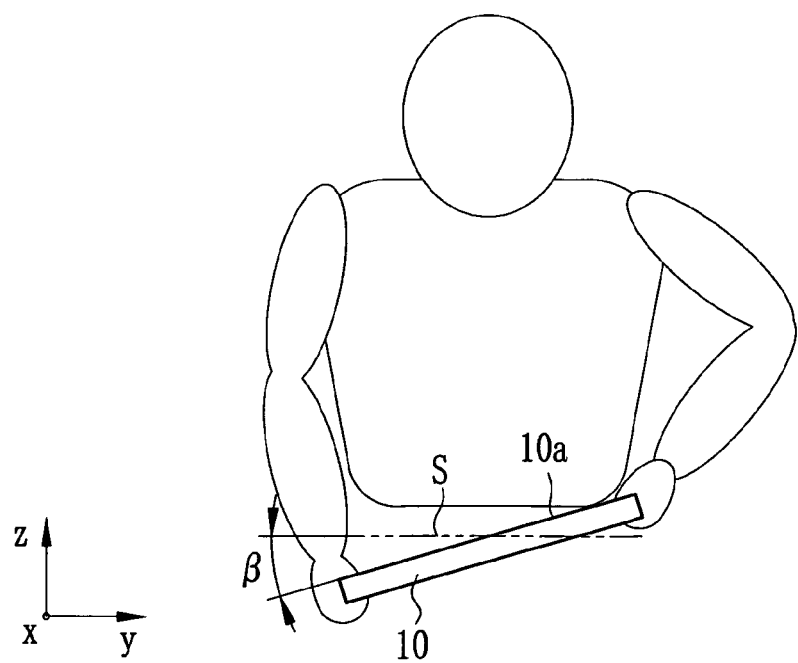
FIG. 7B is a diagram illustrating the image display apparatus inclined around an axis in the x direction as a rotation center.

Hereinafter, explanation will be made on a case where the image display apparatus 10 in the horizontal state is inclined by an angle β in the y direction. As illustrated in FIG. 7A, the perceptive aspect S of the three-dimensional image that is stereoscopic-view-displayed when the image display apparatus 10 is held horizontally is set as a reference. FIG. 7A illustrates a case where the display surface 10a of the image display apparatus 10 in the horizontal state and the perceptive aspect S of the three-dimensional image are in the same plane. From this state, the user inclines the image display apparatus 10 by the angle β in the counterclockwise direction around an axis in the x direction as the rotation center, as illustrated in FIG. 7B. The controller 11 of the image display apparatus 10 calculates an angle of inclination β of the image display apparatus 10 based on a detection signal as a result of performing detection by the inclination sensor 16. The image processing unit 12 generates a three-dimensional image by using a read two-dimensional image and a disparity amount of human being, other than the calculated angle of inclination β. The display controlling unit 13 displays the generated three-dimensional image on the display unit 15. Accordingly, the stereoscopic view display of the three-dimensional image is performed. The perceptive aspect S of the three-dimensional image in the stereoscopic view display is in the same plane as the perceptive aspect S of the three-dimensional image that is stereoscopic-view-displayed when the image display apparatus 10 is held horizontally.

In this case, although the image display apparatus 10 is inclined by the angle in the counterclockwise direction around the axis in the x direction as the rotation center, similar processing is performed when the image display apparatus 10 is inclined by the angle β in the clockwise direction around the axis in the x direction as the rotation center as well.

Although FIG. 7A and FIG. 7B illustrate the cases where the display surface 10a of the image display apparatus 10 in the horizontal state and the perceptive aspect S of the three-dimensional image are in the same plane, for the sake of explanation, there is no need to limit to this, and it is also possible to apply a case where the perceptive aspect S of the three-dimensional image is inclined in the counterclockwise direction around the axis in the y direction as the rotation center with respect to the display surface 10a of the image display apparatus 10 in the horizontal state, as illustrated in FIG. 3. Further, although the perceptive aspect S of the three-dimensional image is set to the horizontal plane (xy plane), there is no need to limit to this, and it is also possible that the perceptive aspect S of the three-dimensional image is inclined around an axis in the x direction as the rotation center.

In the present embodiment, when the angle of inclination α of the image display apparatus 10 exceeds the threshold value, the threshold value is set to the angle of inclination α, and then the three-dimensional image which takes the set angle of inclination α into consideration is generated, but, there is no need to limit to this, and it is also possible that the generation of three-dimensional image is not performed when the angle of inclination α of the image display apparatus 10 exceeds the threshold value. In this case, it is also possible that only the left-eye image and the right-eye image are generated and the generated left-eye image and right-eye image are alternately displayed, or the two-dimensional image read from the image storage unit 14 is displayed. In this case, since the two-dimensional image is viewed in a planar manner, the perceptive aspect S by which the image is perceived is in the same plane as the display surface 10a.

Further, other than this, it is also possible that the three-dimensional image which takes the angle of inclination α into consideration is generated without performing comparison between the angle of inclination α of the image display apparatus 10 and the threshold value, and the generated three-dimensional image is displayed. For example, when the angle of inclination α of the image display apparatus 10 exceeds the threshold value, the user cannot observe the stereoscopic view display of the three-dimensional image, and the three-dimensional image is viewed in a planar manner. Specifically, the aspect by which the three-dimensional image is perceived coincides with the display surface 10a of the image display apparatus 10.

In the present embodiment, it is designed such that the three-dimensional image is generated by taking the angle of inclination α of the image display apparatus 10 into consideration, thereby allowing the user to observe the stereoscopic view display of the three-dimensional image in an optimum state, but, it is also necessary to take, not only the angle of inclination α of the image display apparatus 10 but also a binocular disparity amount (degree of visual angle) of the user who performs observation, into consideration. When the binocular disparity amount is taken into consideration, not only the determination whether or not the angle of inclination α of the image display apparatus 10 exceeds the threshold value but also determination whether or not the degree of visual angle of both eyes of the user who performs observation is out of a range of fusional limit is performed. Note that the fusional limit has a range of one degree of visual angle with respect to the degree of visual angle with which the stereoscopic view display can be observed in an optimum manner.

For instance, when the angle of inclination α of the image display apparatus 10 becomes equal to or less than the threshold value, the degree of visual angle when the image display apparatus 10 is inclined is calculated, and it is determined whether or not the calculated degree of visual angle falls within the range of fusional limit. In this determination, when the degree of visual angle falls within the range of fusional limit, a three-dimensional image is generated from a two-dimensional image based on the binocular disparity amount (degree of visual angle) of the user who performs observation, and the angle of inclination α of the image display apparatus 10. On the other hand, when the degree of visual angle is out of the range of fusional limit, a three-dimensional image is generated from the two-dimensional image based on, for example, the fusional limit (value of either an upper limit value or a lower limit value) of the binocular disparity amount of the user who performs observation, and the angle of inclination α of the image display apparatus 10.

Further, also when the angle of inclination α of the image display apparatus 10 exceeds the threshold value, it is only required to determine whether or not the degree of visual angle being the binocular disparity amount of the user who performs observation falls within the range of fusional limit, and to generate a three-dimensional image based on the determination result, in a similar manner.

Note that even when the binocular disparity amount of the user who performs observation is out of the range of fusional limit, it is also possible to generate a three-dimensional image based on the binocular disparity amount and the angle of inclination α of the image display apparatus 10 to directly display the generated three-dimensional image on the display unit. Also in this case, the stereoscopic view display of the three-dimensional image cannot be observed, and the three-dimensional image is viewed in a planar manner. Namely, the perceptive aspect S of the stereoscopic-view-displayed three-dimensional image coincides with the display surface 10a of the image display apparatus 10. Further, in such a case, it is also possible to display the two-dimensional image on which the three-dimensional image is based, or to generate the left-eye image and the right-eye image based on the binocular disparity amount in the fusional limit and the angle of inclination α of the image display apparatus 10 to alternately display these images, without generating the three-dimensional image.

In the present embodiment, details of a display area of the three-dimensional image in the image display apparatus 10 are not described, but, it is possible to display the three-dimensional image by using the entire display area of the display unit 15, and it is also possible to display the three-dimensional image by using a part of the display area of the display unit 15.

For example, when the three-dimensional image is displayed by using the entire display area of the display unit 15, a finger of the user sometimes touches the touch screen 17 when the user grips the image display apparatus 10. In such a case, the finger that touches the touch screen 17 exerts an influence on the perceptive aspect S of the three-dimensional image displayed on the display unit 15 of the image display apparatus 10, which results in giving a sense of incompatibility to the stereoscopic view display.

Figure 8A:
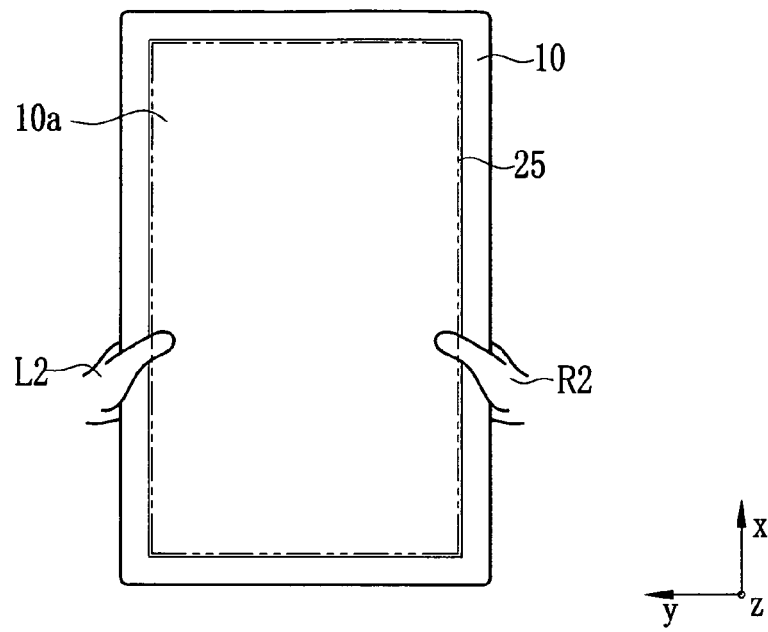
FIG. 8A is a diagram illustrating positions of thumbs of both hands when they are put on the display surface, and a size of a displayed three-dimensional image.
Figure 8B:
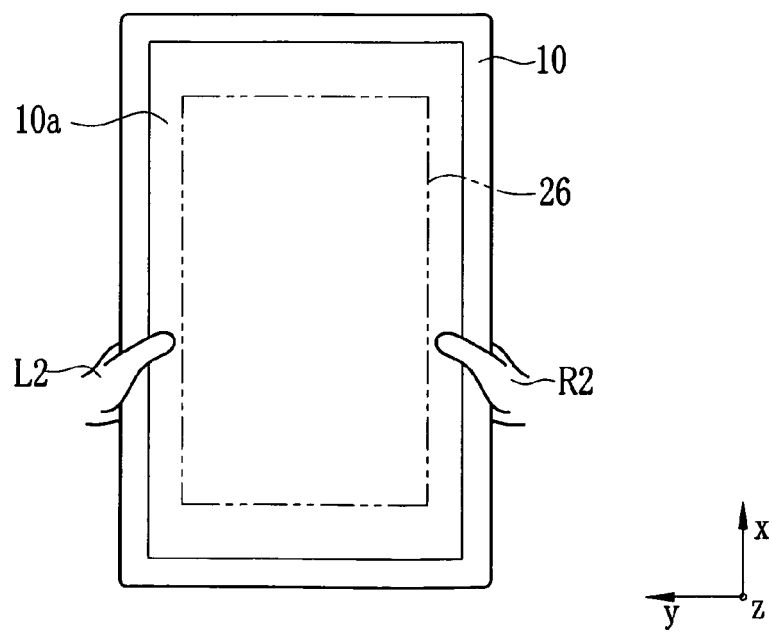
FIG. 8B is a diagram illustrating a case where an area on which the three-dimensional image is displayed is reduced in accordance with the positions of the thumbs put on the display surface.

As illustrated in FIG. 8A, an area 25 denoted by a reference numeral of the display unit 15 of the image display apparatus 10 is an area on which the three-dimensional image is displayed. When a finger of human being touches the touch screen 17 at the time of displaying the three-dimensional image by using the entire area, a finger-touched position is detected by the touch screen 17. Note that FIG. 8A illustrates a case where both of a thumb of a left hand L2 and a thumb of a right hand R2 are detected by the touch screen 17. In response to this, the controller 11 gives an instruction to the image processing unit 12 indicating that reduction processing is performed on the data on which the three-dimensional image which is being displayed on the display unit 15 is based. The image processing unit 12 performs the reduction processing on the data on which the three-dimensional image is based. Here, a reduction ratio in the reduction processing of data is a scale at which the three-dimensional image can be displayed within a range where the finger of human being does not touch the touch screen 17. Further, the image processing unit 12 performs, at the time of the reduction processing, the reduction processing by fixing an aspect ratio of the three-dimensional image. The display controlling unit 13 displays the three-dimensional image on the display unit 15 by using the reduction-processed data. Note that an area 26 illustrated in FIG. 8B is an area on which the reduction-processed three-dimensional image is displayed. Accordingly, it is prevented that the finger that touches the touch screen 17 exerts an influence on the perceptive aspect S of the three-dimensional image displayed on the display unit 15 of the image display apparatus 10, which gives the sense of incompatibility to the stereoscopic view display.

Figure 9A:
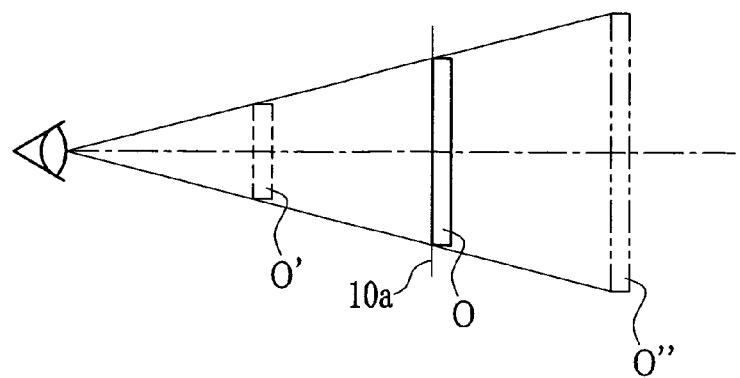
FIG. 9A is a diagram illustrating a change in size of a displayed object due to a depth range in a stereoscopic view display.
Figure 9B:
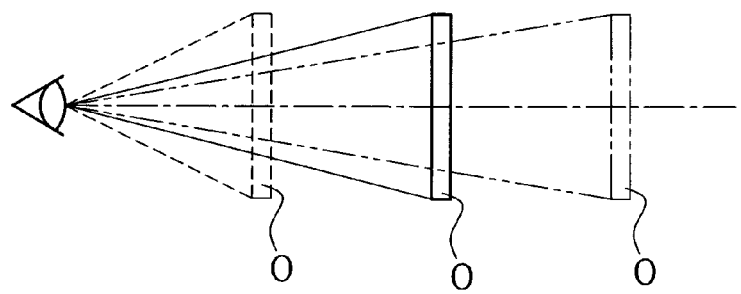
FIG. 9B is a diagram illustrating sizes of the object when the object is actually moved.

Incidentally, when the three-dimensional image is displayed by the image display apparatus 10, a size of an object in the stereoscopic view display is fixed to a size in the three-dimensional image displayed on the display unit 15 of the image display apparatus 10. As illustrated in FIG. 9A, when a case where an object O is displayed on the display surface 10a and a case where the object O is displayed in front of (on a near side of) the display surface 10a (a case where the object is displayed at a position of reference numeral O') are compared, the object O is observed to have a small size when it is displayed on the near side of the display surface 10a. Further, when a case where the object O is displayed on the display surface 10a and a case where the object O is displayed behind (on a far side of) the display surface 10a (a case where the object is displayed at a position of reference numeral O") are compared, the object O is observed to have a large size when it is displayed on the far side of the display surface 10a. Meanwhile, as illustrated in FIG. 9B, in an actual space, when the object O at a predetermined position is approximated to a position indicated by a dotted line in FIG. 9B, the object is recognized to have a large size. Further, when the object O at the predetermined position is distanced to a position indicated by a two-dot chain line in FIG. 9B, the object O is recognized to have a small size.

Figure 10:
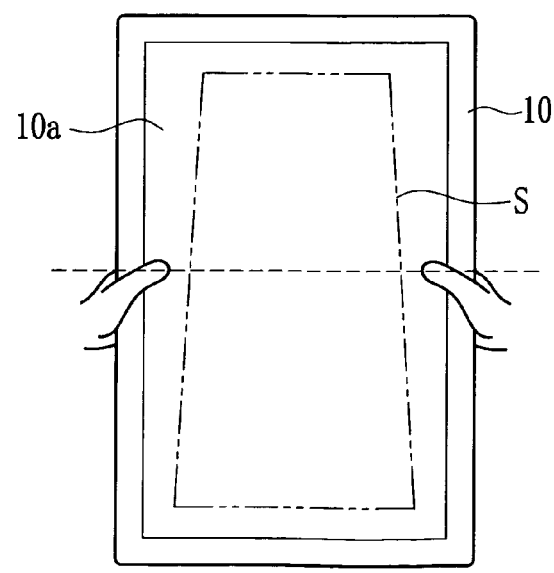
FIG. 10 is a diagram illustrating a size of a three-dimensional image on the display surface.

Specifically, the change in size of the object in the stereoscopic view display in the image display apparatus 10 is different from the change in size when the object is actually viewed, resulting in that the stereoscopic view display becomes likely to be unnatural. In order to eliminate such unnaturalness, a width of the perceptive aspect S is shortened (reduced) when the perceptive aspect S is positioned on the far side of the display surface 10a, and the width of the perceptive aspect S is lengthened (increased) when the perceptive aspect S is positioned on the near side of the display surface 10a, for example, as illustrated in FIG. 10. Specifically, the width of the perceptive aspect S in the stereoscopic view display is adjusted in accordance with depth information. In this case, when the perceptive aspect S is reduced, for example, a resolution in the stereoscopic view display is also reduced, so that a scale of the three-dimensional image to be stereoscopic-view-displayed, an angle of inclination of the perceptive aspect generated at the time of performing the stereoscopic view display, a position of axis to be the rotation center at the time of generating the perceptive aspect, and the like, may be changed in accordance with a type of the three-dimensional image to be displayed.

For example, since a character requires a resolution, when it is stereoscopic-view-displayed, a reduction ratio for the character is set to be smaller than that for the other objects. Further, when a slide show of images is stereoscopic-view-displayed, since the slide show itself does not need detailed expression, the angle of inclination of the perceptive aspect in the stereoscopic view display is set to an angle at which the display can be properly performed even if the perceptive aspect is inclined on the far side of the display surface of the image display apparatus.

Figure 11A:
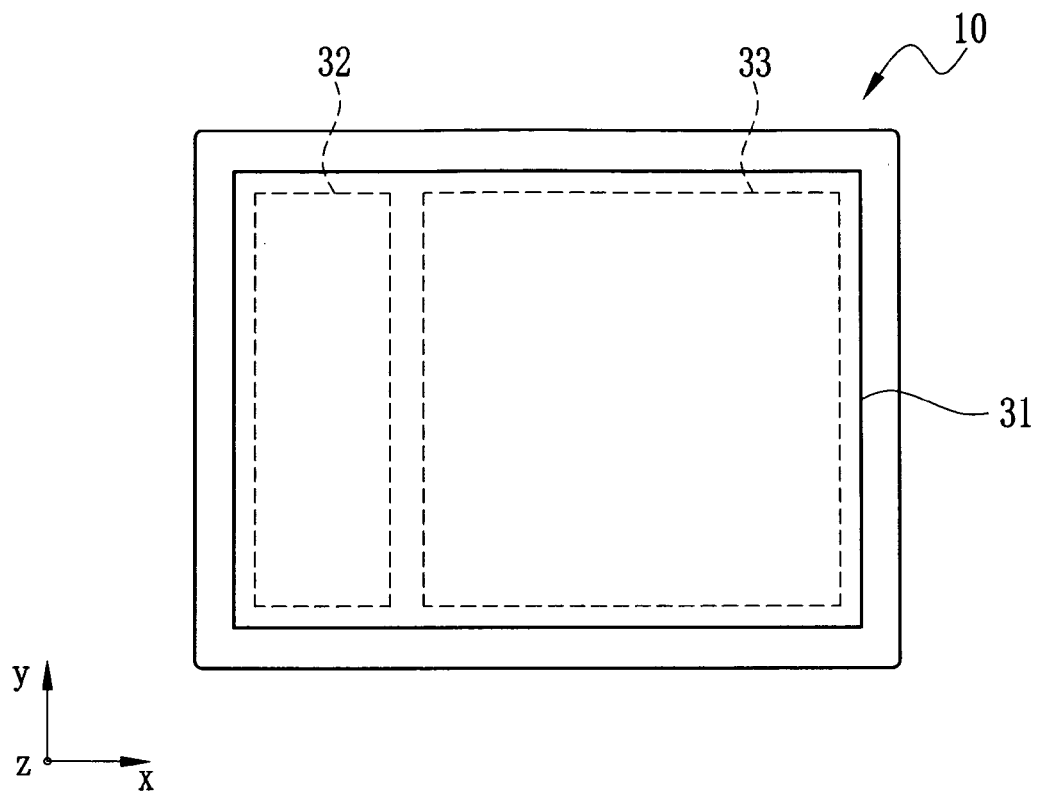
FIG. 11A is a plan view illustrating a case where a display area of the image display apparatus is formed of a keyboard display area and a text input area.

Hereinafter, explanation will be made on a case where the three-dimensional image is displayed by using a part of the display area of the display unit 15. As illustrated in FIG. 11A, on a display area 31 of the image display apparatus 10, there are provided an area on which a keyboard (soft keyboard) with which character input is performed (hereinafter, referred to as keyboard display area) 32, and an area on which the input character is displayed (hereinafter, referred to as text input area) 33. In this case, an image of the soft keyboard to be displayed on the keyboard display area 32 (referred to as keyboard image, hereinafter) is formed as a two-dimensional image. The image processing unit 12 generates a three-dimensional image as an image to be displayed on the text input area 33 (referred to as text input image, hereinafter). The keyboard image and the text image are synthesized by the image processing unit 12 to be output to the display controlling unit 13. The display controlling unit 13 outputs the synthesized image to the display unit 15, which results in displaying the synthesized image, namely, the keyboard image and the text input image, on the display unit 15.

When the generated images are displayed on the display unit 15, since the keyboard image is the two-dimensional image, the user observes the planar-view-displayed keyboard image. On the other hand, since the text input image is the three-dimensional image, the user observes the stereoscopic-view-displayed text input image.

Figure 11B:
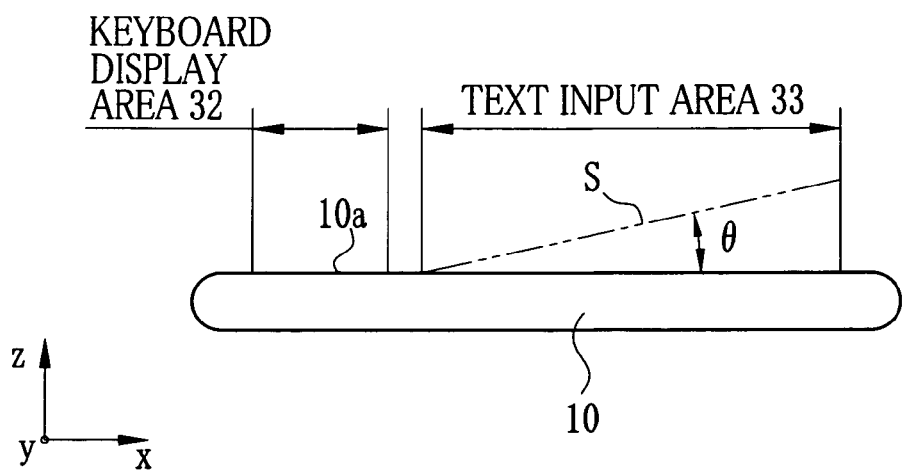
FIG. 11B is a diagram illustrating a state of display surface of image displayed on each of the displayed areas.

As illustrated in FIG. 11B, the text input image is generated so that a perceptive aspect S thereof becomes in a state of being inclined by an angle $\theta(=\theta_0)$ with respect to the display surface 10a of the image display apparatus 10 in the horizontal state, for example. Accordingly, the user can observe the stereoscopic view display of the three-dimensional image displayed on the text input area 33 out of the display area 31 of the image display apparatus 10 in an optimum state. Note that although the explanation is made on the case where the keyboard display area 32 and the text input area 33 are provided, there is no need to limit to this, and such processing can be performed when the two-dimensional image and the three-dimensional image are both displayed at the same time.

Here, when the three-dimensional image is displayed by using the entire display area of the display unit 15, an effect of stereoscopic view display is often reduced at an outer peripheral edge of the display unit 15. Further, when the user grips the image display apparatus 10, the finger of the user is put on the display unit 15, which sometimes reduces the effect of stereoscopic view display. For this reason, when the stereoscopic view display is performed by using the entire display area of the display unit 15, it is also possible to set the perceptive aspect S in the stereoscopic view display so that depth information (depth range) in the outer peripheral edge portion of the display area becomes 0. In this case, the perceptive aspect S is preferably formed to have a shape of either a curved surface having an arc-shaped or an elliptic arc-shaped cross section, or a bending surface having a trapezoid-shaped or a triangular-shaped cross section. Hereinafter, explanation will be made on a case where the perceptive aspect S is formed of an arc-shaped curved surface.

Here, since there is provided the touch screen 17 in the image display apparatus 10, when the finger of the user is detected by the touch screen 17, a depth range in an area detected by the touch screen 17 is set to 0, and depth ranges in the other areas are adjusted. For example, when the perceptive aspect S in the stereoscopic view display is formed as a curved surface, a curvature of the perceptive aspect S in an area on which the finger of the user is not put, is increased. In this case, an axial direction when the perceptive aspect S is formed as the curved surface is set based on positions of a finger of a left hand and a finger of a right hand of the user detected by the touch screen 17. The image processing unit 12 generates a three-dimensional image when the perceptive aspect S in the stereoscopic view display is formed as the curved surface, based on a two-dimensional image, the disparity amount of human being and the axial direction of the curved surface, and a size of the display unit or the like.

Figure 12A:
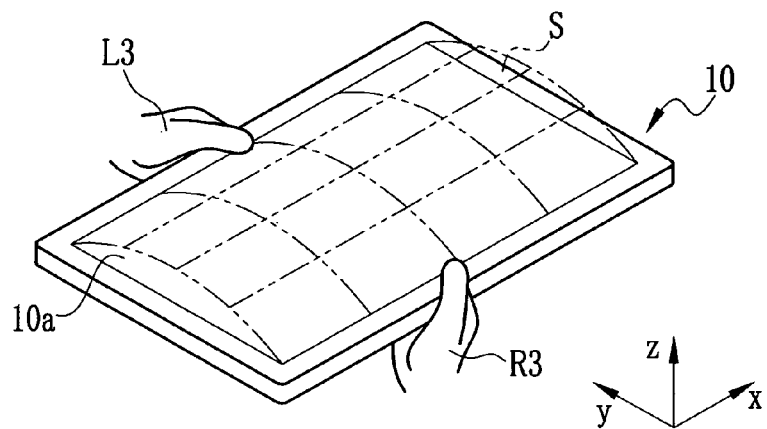
FIG. 12A is a diagram when the perceptive aspect in the stereoscopic view display is formed as a curved surface when roughly a center of the image display apparatus in the x direction is gripped.

As illustrated in FIG. 12A, when a thumb of a left hand L3 and a thumb of a right hand R3 of the user are detected at center portions in a longitudinal direction (x direction) of the touch screen 17, the image processing unit 12 generates a three-dimensional image so that depth ranges in both end portions in the y direction are set to 0, and a depth range in another area is emphasized. Accordingly, the perceptive aspect S in the stereoscopic view display of the three-dimensional image is observed as a curved surface that projects on the near side (front surface side) of the display surface 10a by setting the y direction as the axial direction. Note that when the thumb of the left hand L3 and the thumb of the right hand R3 of the user are detected at center portions in a short side direction (y direction) of the touch screen 17, a three-dimensional image is generated so that depth ranges in both end portions in the x direction are set to 0, and a depth range in another area is emphasized. In this case, although the illustration is omitted, the perceptive aspect S in the stereoscopic view display of the three-dimensional image is observed as a curved surface that projects on the near side (front surface side) of the display surface 10a by setting the x direction as the axial direction.

Figure 12B:
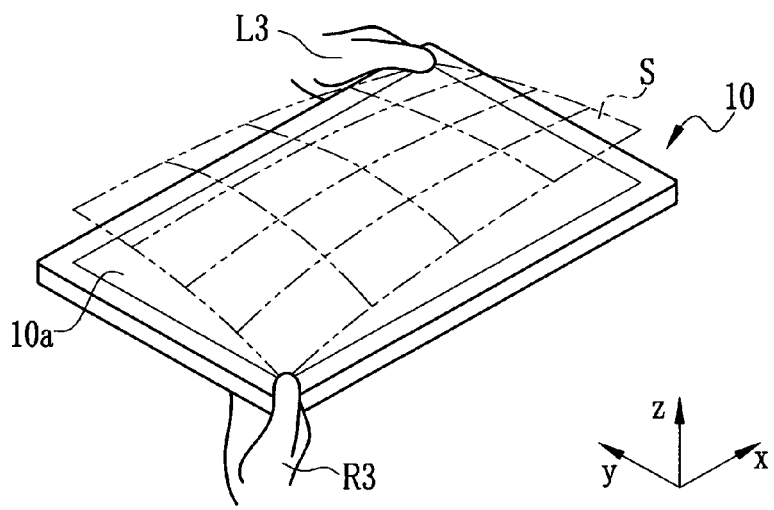
FIG. 12B is a diagram when the perceptive aspect in the stereoscopic view display is formed as a curved surface when opposing two corners out of four corners of the image display apparatus are gripped.

Further, as illustrated in FIG. 12B, when the thumb of the left hand L3 and the thumb of the right hand R3 of the user are detected at positions of opposing two corners out of four corners of the touch screen 17, the image processing unit 12 generates a three-dimensional image so that depth ranges in the two corners detected by the touch screen 17 are set to 0, and a depth range in another area is emphasized. Accordingly, the perceptive aspect S in the stereoscopic view display of the three-dimensional image is observed as a curved surface that projects on the near side (front surface side) of the display surface 10a by setting a straight line connecting two corners which are not detected by the touch screen 17 as the axial direction.

Figure 12C:
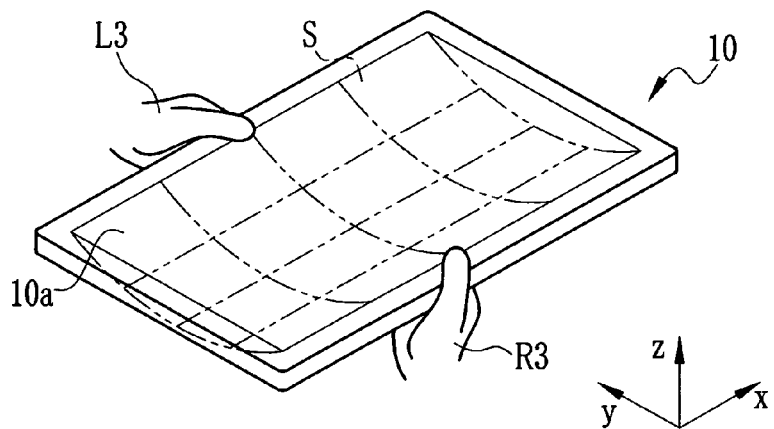
FIG. 12C is a diagram when the perceptive aspect is formed as a curved surface that is curved on a far side of the display unit.

Note that in these cases, although the perceptive aspect S is formed as the curved surface that projects on the near side (front surface side) of the display surface 10a, there is no need to limit to this, and as illustrated in FIG. 12C, the perceptive aspect S may also be formed as a curved surface that is recessed on the far side (back surface side) of the display surface 10a.

Here, there is also a case where the finger of the user holding the image display apparatus 10 moves. When a distance from a peripheral edge of the touch screen 17 to a position at which the finger of the user is put on changes as above, it is also possible to change the curvature of the curved surface being the perceptive aspect S in the stereoscopic view display.

Note that there is also a case where the touch screen 17 is not provided in the image display apparatus 10. As illustrated in FIG. 13A, when the perceptive aspect S is made to be observed as a curved surface in such an image display apparatus 10 including no touch screen 17, a plurality of point sensors 34 are disposed on side surfaces of the image display apparatus 10 with a predetermined interval therebetween, for example, and a hand that grips the image display apparatus 10 is detected by the point sensor 34. Here, it is preferable that the point sensor 34 is provided on each of three portions of a left end portion, a center portion and a right end portion of each of the side surfaces of the image display apparatus 10.

Also in this case, when the hand of the user is detected by the point sensor 34, a three-dimensional image is generated so that a depth range for a predetermined area set with respect to the position detected by the point sensor 34 out of the display surface 10a of the image display apparatus 10 is set to 0, and a depth range for another area is emphasized. Also when the three-dimensional image generated as above is displayed, it is possible to allow the user to observe the perceptive aspect S in the stereoscopic view display as a curved surface, in a similar manner to the case of using the touch screen 17.

Further, as illustrated in FIG. 13B, it is also possible to provide pressure sensitive sensors 35 instead of providing the point sensors 34 on the side surfaces of the image display apparatus 10.

In the present embodiment, although the case in which the entire three-dimensional image is stereoscopic-view-displayed is explained, there is no need to limit to this, and it is also possible to perform stereoscopic view display of only an object included in the image. As illustrated in FIG. 14A, three-dimensional images of a plurality of operation buttons 36, 37, 38 displayed on the image display apparatus 10 are respectively generated, and these three-dimensional images are displayed, for example. At this time, the three-dimensional images of the respective operation buttons 36, 37, 38 may be generated as images in which heights (depth ranges) of the respective operation buttons 36, 37, 38 are respectively adjusted so that an angle θ made by a plane P passing through centers of upper surfaces of the respective operation buttons 36, 37, 38, and the display surface 10a of the image display apparatus 10 becomes an angle at which the user can observe the stereoscopic view display in an optimum manner, as illustrated in FIG. 14B. Note that also in such a case, there is a need to generate, when the image display apparatus 10 is inclined, the three-dimensional images of the respective operation buttons by taking the angle of inclination of the apparatus into consideration.

In the present embodiment, although the three-dimensional image generated from the two-dimensional image is generated, and the three-dimensional image is displayed by the image display apparatus 10, there is no need to limit to this, and it is possible to apply the present embodiment even when the image stored in the image storage unit 14 is a three-dimensional image. In this case, it is only required that information of binocular disparity or the like is previously added to the three-dimensional image, and the three-dimensional image to be displayed is corrected by using the binocular disparity amount of the user who performs observation, and the angle of inclination α of the image display apparatus 10.

Figure 15:
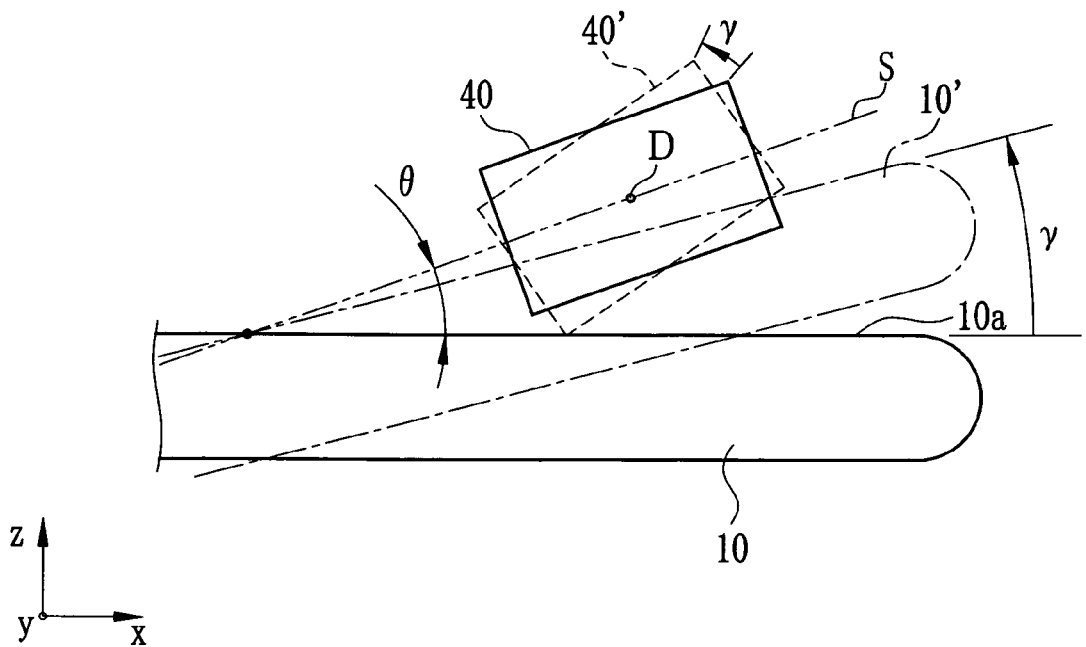
FIG. 15 is a diagram when an object included in a three-dimensional image is rotated in accordance with an inclination of the image display apparatus.

Further, when the three-dimensional image stored in the image storage unit 14 is displayed, it is also possible to incline an object included in the three-dimensional image in accordance with an angle of inclination of the image display apparatus 10. As illustrated in FIG. 15, when the three-dimensional image is displayed on the image display apparatus 10 which is in the horizontal state, an object 40 included in the three-dimensional image is observed by the user through the stereoscopic view display. At this time, it is set that the perceptive aspect S is in a state of being inclined by an angle θ with respect to the display surface 10a of the image display apparatus 10. For example, a case where the image display apparatus 10 is inclined by an angle γ from a position indicated by a solid line in FIG. 15 to a position indicated by a dashed line in FIG. 15 (position of reference numeral 10'), is considered. At this time, the object 40 observed through the stereoscopic view display is displayed to be inclined in the counterclockwise direction by the angle γ from a position indicated by a solid line to a position indicated by a dotted line (position of reference numeral 40') around an axis in the y direction passing through a center D of the object 40 as a rotation center.

In this case, the object 40 included in the three-dimensional image is inclined (rotated) by the same angle as the angle of inclination γ of the image display apparatus 10, but, in addition to that, it is also possible to correct the three-dimensional image by performing processing for adding a change in the binocular disparity amount of the user generated when the image display apparatus 10 is inclined, to the binocular disparity amount used at the time of generating the three-dimensional image, for example.

Note that when the image display apparatus 10 is inclined, the object included in the displayed three-dimensional image is inclined, in the stereoscopic view display of the object, in accordance with the angle of inclination γ of the image display apparatus 10, but, there is no need to limit to this, and it is also possible to change a depth range for an area other than an area of the object included in the three-dimensional image when the image display apparatus 10 is inclined, for instance.

In the present embodiment, the touch screen 17 is not described in detail, but, when a touch screen of capacitive or electromagnetic induction type is used, for example, it is also possible to change a detection sensitivity in the touch screen in accordance with an angle made by the perceptive aspect and the display surface of the image display apparatus. Hereinafter, explanation will be made by giving the same reference numerals to the same portions as those of the present embodiment.

Figure 16:
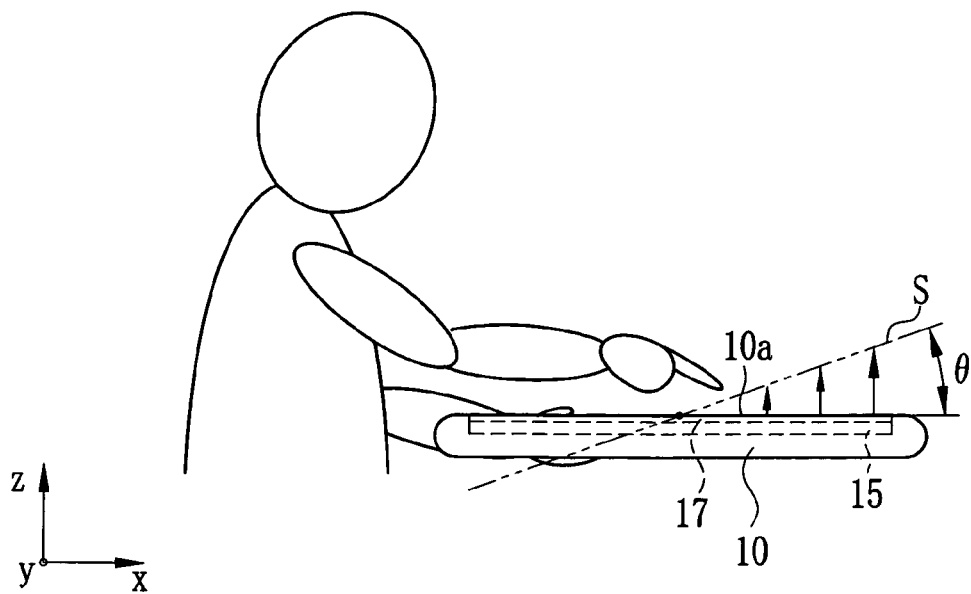
FIG. 16 is a diagram illustrating a relation between a sensitivity of touch screen and a perceptive aspect of a stereoscopic-view-displayed three-dimensional image.

As illustrated in FIG. 16, in the image display apparatus 10 in the horizontal state, the perceptive aspect S of the stereoscopic-view-displayed three-dimensional image is observed in a state of being inclined by an angle θ with respect to the display surface 10a of the image display apparatus 10. A detection sensitivity of the touch screen 17 is set in accordance with the perceptive aspect S observed as above. Accordingly, when the user sticks his/her finger out to the perceptive aspect S, the performance of input operation is detected without touching the touch screen 17, so that the input operation can be performed without touching the touch screen 17. Note that when the image display apparatus 10 is inclined, the three-dimensional image is generated in accordance with the angle of inclination, so that the detection sensitivity of the touch screen 17 may be adjusted in accordance with this.

By setting the detection sensitivity of the touch screen 17 as above, the user can perform the input operation without touching the touch screen 17, only by sticking his/her finger out to the perceptive aspect S in the stereoscopic view display. However, such an input operation has a disadvantage that the user does not have the feeling of performing the input operation, which only makes it difficult to perform the input operation. Accordingly, it is also possible to design such that when the user performs the input operation, the feeling of performing the operation is given to the user.

Figure 17:
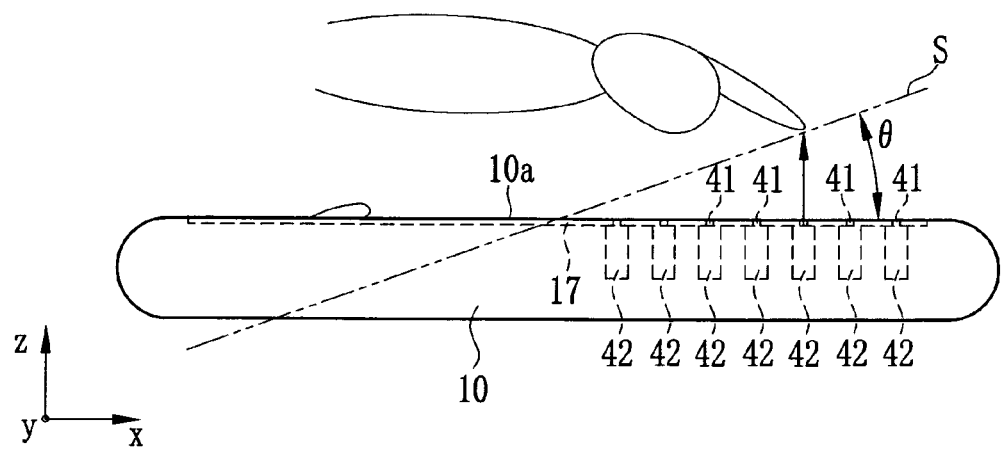
FIG. 17 is a diagram illustrating an image display apparatus provided with blower modules.

As illustrated in FIG. 17, a plurality of holes 41 are two-dimensionally provided on the touch screen 17, and blower modules 42 are provided inside the image display apparatus 10 from these holes 41. Note that the blower modules 42 may be provided to correspond to the respective holes 41 provided on the touch screen 17 or may also be provided to correspond to a part of the holes out of the plurality of holes, and as long as a configuration in which wind is blown out from each of the holes 41 is adopted, the number of the blower modules 42 is not necessarily the number corresponding to the number of the plurality of holes 41.

As described above, when the three-dimensional image is displayed in the image display apparatus 10, the stereoscopic view display is observed by the user on the perceptive aspect S inclined by the angle θ with respect to the display surface 10a of the image display apparatus 10. When the user sticks his/her finger out to the perceptive aspect S during when the stereoscopic view display is performed, the finger is detected by the touch screen 17. When the finger is detected by the touch screen 17, the controller 11 determines position coordinates based on the detection signal of the touch screen 17. The controller 11 drives the blower module 42 corresponding to the determined position coordinates. Accordingly, wind is blown out through the hole 41 at the position at which the finger is detected. Here, the strength of wind blown out from the hole 41 may be set to change in accordance with a distance from the display surface 10a to the finger or may also be set to a constant strength.

Note that the aforementioned bower module 42 is sometimes difficult to be disposed depending on an internal configuration of the image display apparatus 10, so that it is also possible to provide a blower module which blows out wind from an outer peripheral portion of the display surface 10a. In this case, it is designed such that a direction of blown-out wind is adjusted in accordance with a position and a height of a finger detected by the touch screen 17 so that the wind is blown toward the finger. Accordingly, it is possible to give the operating feeling of the input operation to the user, resulting in that the sense of incompatibility at the time of performing the input operation can be reduced.

Note that in this case, it is designed to give the operating feeling of the input operation to the user with the use of the blown-out wind, but, there is no need to limit to this, and it is also possible to provide a module that jets drops of water, with which the operating feeling of the input operation is given to the user by jetting drops of water toward the finger.

Further, other than this, it is also possible to generate the operating feeling at the time of performing the input operation by utilizing a magnetic force. For example, a magnetic force generating means generating a magnetic force such as a coil is provided in the vicinity of the display surface 10a of the image display apparatus 10. When operating the image display apparatus 10, the user performs operation by putting on a glove provided with a magnetic material on fingertips thereof. In this case, when the user approximates the finger to the image display apparatus 10, the finger is detected by the touch screen 17. When the finger is detected by the touch screen 17, the magnetic force generating means generates the magnetic force so that a repulsive force is generated with respect to the magnetic material. Accordingly, the repulsive force is applied to the finger of the user, which enables to give the operating feeling at the time of performing the input operation to the user.

When the input operation is performed on the perceptive aspect S in the stereoscopic view display as described above, the finger of the user is sometimes positioned closer than the perceptive aspect S to the display surface 10a.

Figure 18:
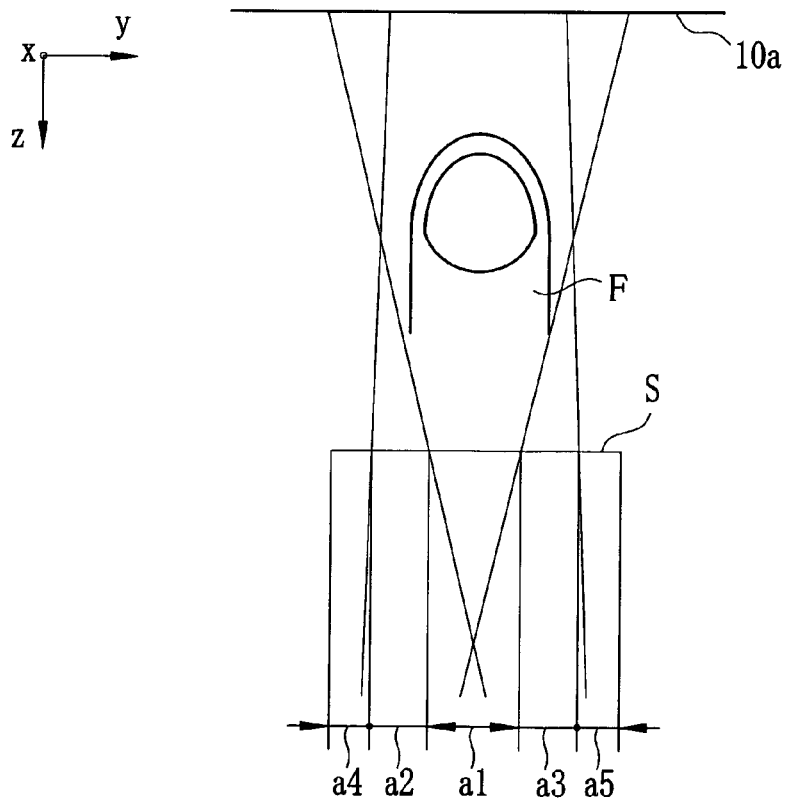
FIG. 18 is a diagram illustrating a state where a finger is positioned closer than the perceptive aspect to the display surface.

As illustrated in FIG. 18, when a position of finger F of the user is closer than a position of the perceptive aspect S in the stereoscopic view display to the image display apparatus 10, there are appeared, in the stereoscopic view display, three areas which are an area that is hidden by the finger F and thus cannot be observed (area a1, in the drawing), areas each observed due to disparity by only one eye (areas a2, a3, in the drawing), and areas observed on the perceptive aspect S (areas a4, a5, in the drawing). As above, since the area which is hidden by the finger F and cannot be observed is generated, a stereoscopic effect of an object in the stereoscopic view display of the three-dimensional image is lost.

Accordingly, by detecting the finger F of the user by the touch screen 17 provided to the image display apparatus 10, position coordinates of the finger F on the display surface 10a and a distance from the display surface 10a to the finger F are determined, and when the finger F is positioned closer than the perceptive aspect S to the display surface 10a, the depth range in the three-dimensional image is changed so that the perceptive aspect S is positioned closer than the finger F to the display surface 10a. Note that the change in the depth range may be performed only on an object whose position corresponds to the position of the finger F, or may also be performed on the entire image. In this case, a capacitive touch screen is used as the touch screen 17.

Hereinafter, explanation will be made on a case where a distance from the display surface 10a of the image display apparatus 10 to the display aspect S in the stereoscopic view display is set to D1. As described above, when the user sticks his/her finger F out toward the display surface 10a of the image display apparatus 10, the finger is detected by the touch screen 17. Upon receiving the detection signal from the touch screen 17, the controller 11 calculates a position (coordinates) on the display surface 10a and a distance D from the display surface 10a to the finger F.

Subsequently, the controller 11 compares the calculated distance D with the distance D1 from the display surface 10a of the image display apparatus 10 to the display aspect S in the stereoscopic view display. For instance, when the calculated distance D becomes equal to or greater than the distance D1 from the display surface 10a of the image display apparatus 10 to the display aspect S in the stereoscopic view display (D≧D1), the controller 11 determines not to change the depth range in the three-dimensional image generated by the image processing unit 12. In this case, the distance D1 from the display surface 10a of the image display apparatus 10 to the display aspect S in the stereoscopic view display is maintained as it is.

On the other hand, when the calculated distance D becomes less than the distance D1 from the display surface 10a of the image display apparatus 10 to the display aspect S in the stereoscopic view display (D<D1), the controller 11 determines to change the depth range in the three-dimensional image generated by the image processing unit 12. In this case, the controller 11 outputs a signal instructing to generate a three-dimensional image and information of the calculated distance D, to the image processing unit 12. Upon receiving them, the image processing unit 12 generates a new three-dimensional image by using the input information of the distance D to output it to the display controlling unit 13. The display controlling unit 13 displays the generated three-dimensional image on the display unit 15.

Figure 19A:
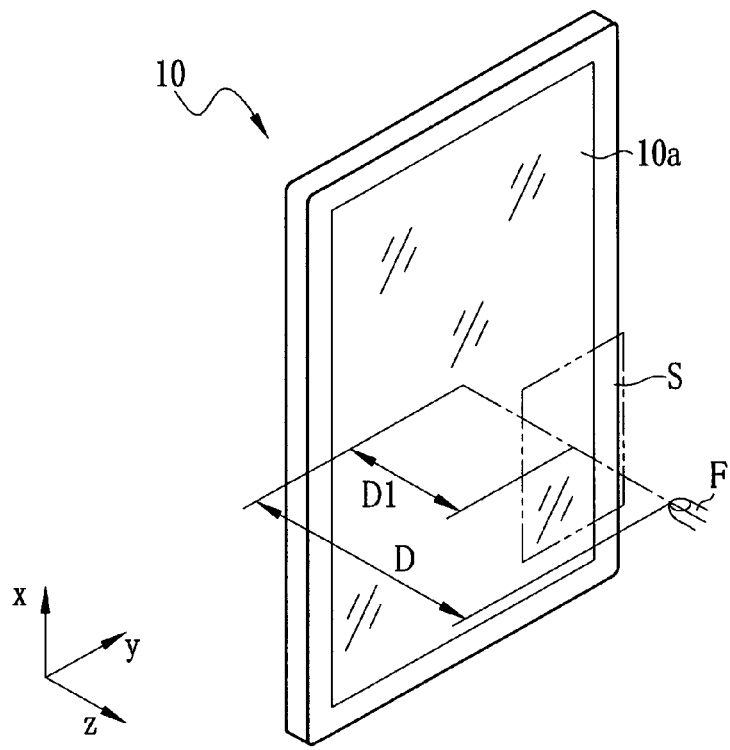
FIG. 19A is a diagram illustrating a state where a finger is positioned farther than the perceptive aspect to the display surface.
Figure 19B:
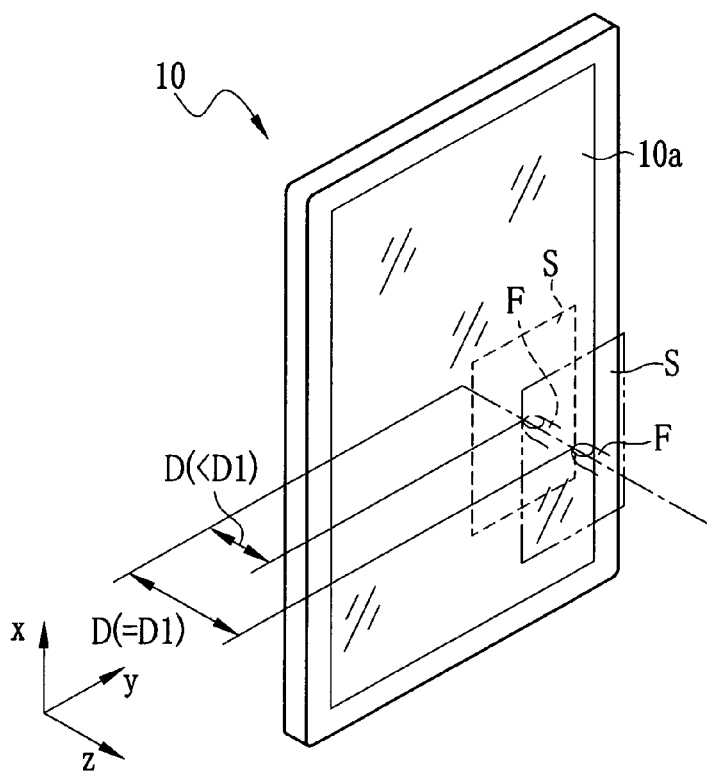
FIG. 19B is a diagram illustrating a case where a position of perceptive aspect is changed in accordance with a movement of finger.

As illustrated in FIG. 19A, for instance, when the finger F of the user is at a position apart from the display surface by the distance D (D>D1), the three-dimensional image displayed on the image display apparatus 10 is observed on the perceptive aspect S. Further, the user approximates the finger F to the display aspect S, and until when the distance D from the display surface 10a to the finger F of the user becomes equal to the distance D1 from the display surface 10a to the perceptive aspect S in the stereoscopic view display (position indicated by a solid line in FIG. 19B), the three-dimensional image displayed on the image display apparatus 10 is displayed on the perceptive aspect S. As illustrated in FIG. 19B, when the user moves the finger F toward the display surface 10a, the perceptive aspect S is also moved toward the display surface 10a in accordance with the movement of the finger F. Namely, when the finger F is moved within the distance D1 from the display surface 10a to the perceptive aspect S in the stereoscopic view display, the distance from the display surface 10a to the perceptive aspect S in the stereoscopic view display is also changed in accordance with the distance D from the display surface 10a to the finger F.

Note that when the finger F touches the display surface 10a of the image display apparatus 10, the movement of the finger F is stopped. At this time, the perceptive aspect S in the stereoscopic view display of the three-dimensional image coincides with the display surface 10a. As the image displayed on the display unit 15 when the finger F touches the display surface 10a of the image display apparatus 10, it is also possible to display a three-dimensional image or a two-dimensional image on which the three-dimensional image is based.

As described above, the depth range of the perceptive aspect S is changed in accordance with the distance from the finger F that moves to the display surface 10a, which eliminates a state where the finger F that moves is positioned closer than the perceptive aspect S to the display surface 10a, resulting in that the stereoscopic effect in the stereoscopic view display of the three-dimensional image can be prevented from being lost.

Figure 20:
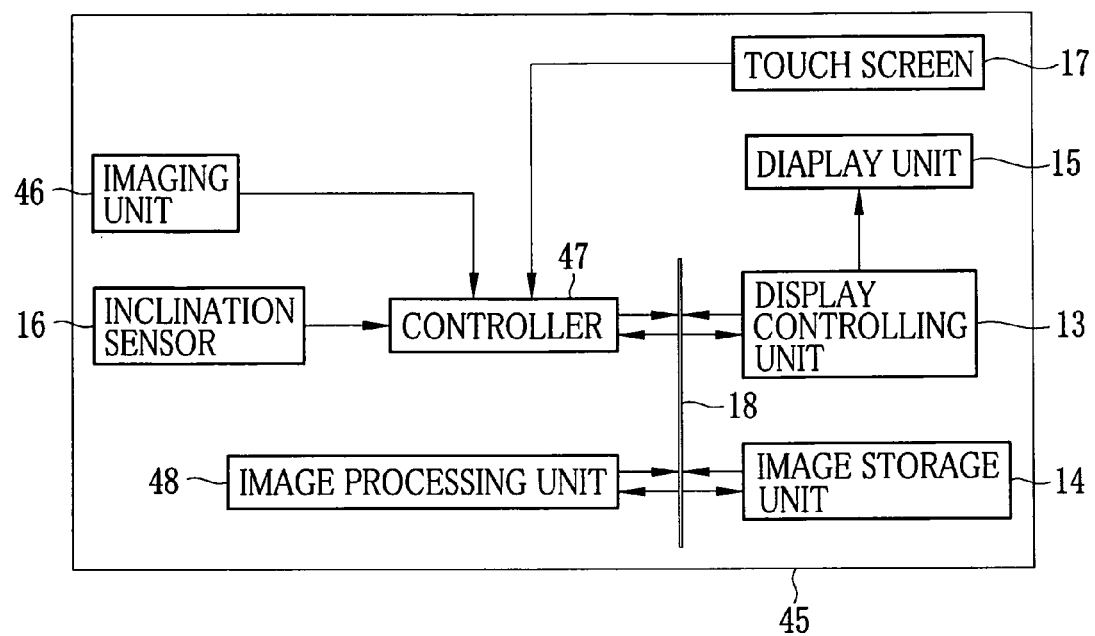
FIG. 20 is a functional block diagram illustrating a configuration of an image display apparatus including an imaging unit capable of performing three-dimensional position measurement.
Figure 21:
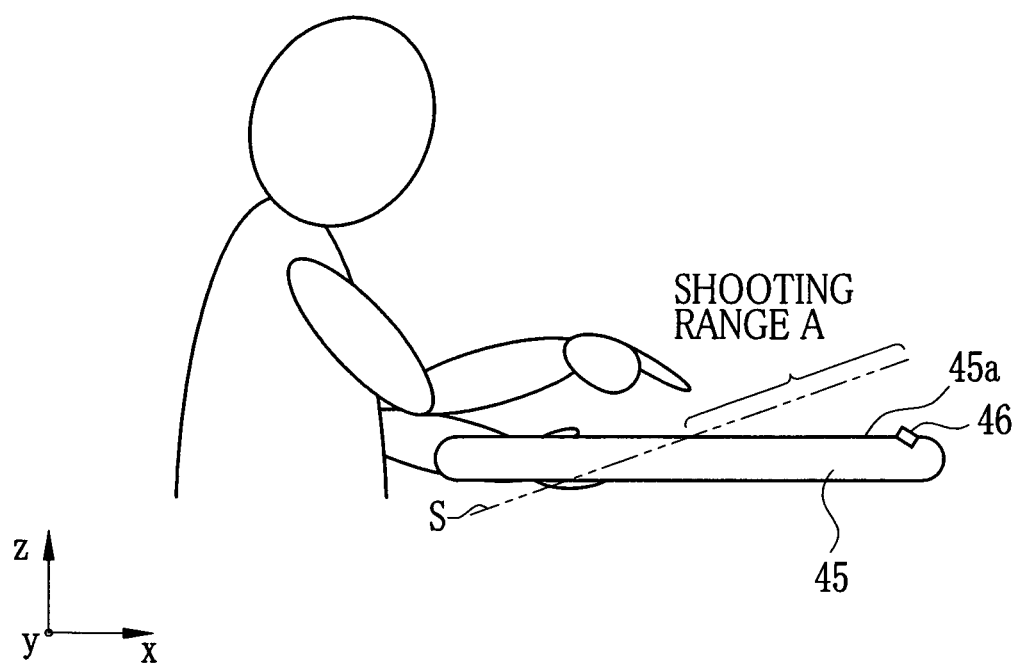
FIG. 21 is a diagram illustrating a relation between the imaging unit capable of performing three-dimensional position measurement and a perceptive aspect of a stereoscopic-view-displayed three-dimensional image.

In the present embodiment, it is designed to allow the user to observe the stereoscopic view display of the three-dimensional image in an optimum state by generating the three-dimensional image in accordance with the angle of inclination α of the image display apparatus 10, but, it is also possible to generate a three-dimensional image based on, other than the angle of inclination of the image display apparatus, a state of user who uses the image display apparatus. As illustrated in FIG. 20 and FIG. 21, an imaging unit 46 is provided to an image display apparatus 45. The imaging unit 46 is formed of an imaging element such as a CCD image sensor and a CMOS image sensor, and a wide-angle lens, for example. Note that FIG. 20 illustrates an electrical configuration of the image display apparatus 45 including the imaging unit 46, in which description is made by giving the same reference numerals as those of the present embodiment to portions having the same functions as those of the present embodiment.

For example, when an image display is performed by the image display apparatus 45, the imaging unit 46 obtains an image. The obtained image is input into a controller 47. The controller 47 extracts a person included in the obtained image by using a method such as, for example, subject extraction processing. When the person is extracted, for example, the controller 47 calculates a position of the extracted person, a distance from the image display apparatus 45 to the person, and a position of the person in the image. Further, since a signal from the inclination sensor 16 is input into the controller 47, the controller 47 calculates an angle of inclination α of the image display apparatus 45. The controller 47 outputs the calculated distance to the person, position of the person, and angle of inclination α to an image processing unit 48. Further, the controller 47 determines, based on these values, an angle (angle made by a display surface 45a of the image display apparatus 45 and the perceptive aspect S) θ at which the stereoscopic view display can be observed in an optimum state.

The controller 47 outputs the calculated angle θ to the image processing unit 48. At this time, when the image display apparatus 45 is inclined, the angle of inclination is also output to the image processing unit 48. The image processing unit 48 generates, by using these values, a three-dimensional image from a two-dimensional image read from the image storage unit 14. By displaying the generated three-dimensional image with the use of the display unit 15, the user can observe the stereoscopic view display of the three-dimensional image in an optimum state.

Note that the capturing of images in the imaging unit 46 is continuously performed with a predetermined time interval therebetween. For instance, when a case where the person is not extracted from the images obtained continuously by the imaging unit 46, happens a plurality of times in a continuous manner (in other words, when the person is not detected for a predetermined period of time), the controller 47 determines that the image display apparatus 45 is not used. In this case, the controller 47 stops the image display by the display unit 15, and instructs a shift to a power saving mode.

Note that when the image display apparatus 45 having the aforementioned imaging unit 46 has a function of three-dimensional position measurement, an operation input unit such as the touch screen 17 is not always essential. Here, as the imaging unit 46, there can be cited an imaging unit having an appropriate configuration such as a monocular-type one, a binocular-type one, and a range image sensor.

For example, when a three-dimensional image of operation screen is displayed by the display unit 15, the operation screen is observed by the user through a stereoscopic view display (the operation screen is observed on the perceptive aspect S, in FIG. 21). Note that a position of the stereoscopic-view-displayed operation screen (coordinate value at x, y, z coordinates) is calculated by the controller 47 by using the angle θ made by the perceptive aspect S and the display surface 45a of the image display apparatus 45 or the like. Further, based on images output with a predetermined time interval therebetween from the imaging unit 46, the controller 47 calculates a position of face and a position of hand (three-dimensional coordinate value) of a person who uses the image display apparatus 45. Further, the controller 47 determines whether or not the calculated position of hand (three-dimensional coordinate value) and the position of the stereoscopic-view-displayed operation screen (three-dimensional coordinate value) coincide with each other. For instance, when it is determined that the position of hand of the person and the position of the operation screen coincide with each other, the controller 47 determines that the operation screen is operated, and performs processing based on the operation. On the other hand, when these positions do not coincide with each other, the controller 47 determines that the operation screen is not operated.

Note that the perceptive aspect S of the stereoscopic-view-displayed three-dimensional image is not always observed to be positioned forward of the display surface 45a of the image display apparatus 45. As illustrated in FIG. 21, when a part of the perceptive aspect S of the stereoscopic-view-displayed three-dimensional image is observed to be positioned on the forward side of the display surface 45a of the image display apparatus 45, for example, the capturing of image in which the observed range is set as a shooting range A may be performed by the imaging unit 46.

Further, instead of providing the imaging unit 46 to the image display apparatus 45, it is also possible to provide a touch sensor, a pressure sensitive sensor, and the like which detect that a touch or a grip by a person who uses the image display apparatus 45. In this case, a plurality of the sensors are disposed at positions at which the person touches the image display apparatus. Based on signals output from these sensors, a use state of the image display apparatus is estimated, and based on the estimated use state of the image display apparatus, a three-dimensional image to be displayed is generated. Also in this case, when no signal is output from both of the aforementioned sensors, it is only required to stop the image display in the image display apparatus and to instruct a shift to a so-called power saving mode. Further, it is also possible to provide both of the aforementioned imaging unit and the touch sensor and pressure sensitive sensor to the image display apparatus.

In the present embodiment, the three-dimensional image is generated so that, even when the angle of inclination of the image display apparatus is changed, the perceptive aspect S of the stereoscopic-view-displayed three-dimensional image becomes a fixed aspect (the aspect is fixed) all the time. For this reason, when the image display apparatus is inclined, the angle θ made by the display surface of the image display apparatus and the perceptive aspect S, namely, the depth range in the stereoscopic view display is changed. Since there is also a case where the user does not want such a change in the depth range in the stereoscopic view display, it is also possible to design such that the depth range in the stereoscopic view display can be fixed, namely, the angle θ made by the display surface of the image display apparatus and the perceptive aspect S can be fixed. In this case, it is only required to allow the user to select whether or not the depth range in the stereoscopic view display is fixed (in other words, whether or not the angle θ made by the display surface of the image display apparatus and the perceptive aspect S is fixed).

Further, in the present embodiment, the angle θ made by the display surface of the image display apparatus in the horizontal state and the perceptive aspect S is set to have the value previously obtained through experiments, statistics, and the like, but, it is also possible to design such that the angle θ can be adjusted through an input operation of the user. Note that as the input operation by the user, an operation using the touch screen, the operation buttons, a jog dial, and the like can be cited. When the angle θ is adjusted through the input operation of the user, the angle θ is stored. Further, in processing thereafter, it is only required to generate a three-dimensional image by using this angle θ, so that it becomes possible to allow the user to observe the stereoscopic view display of the three-dimensional image at his/her desired angle of inclination.

In the present embodiment, the depth range in the stereoscopic view display is changed based on the inclination of the image display apparatus, but, it is also possible to change the depth range in the stereoscopic view display by taking, other than the inclination of the image display apparatus, a position of the image display apparatus in a vertical direction into consideration. Note that the vertical direction is, for example, the z direction.

Figure 22:
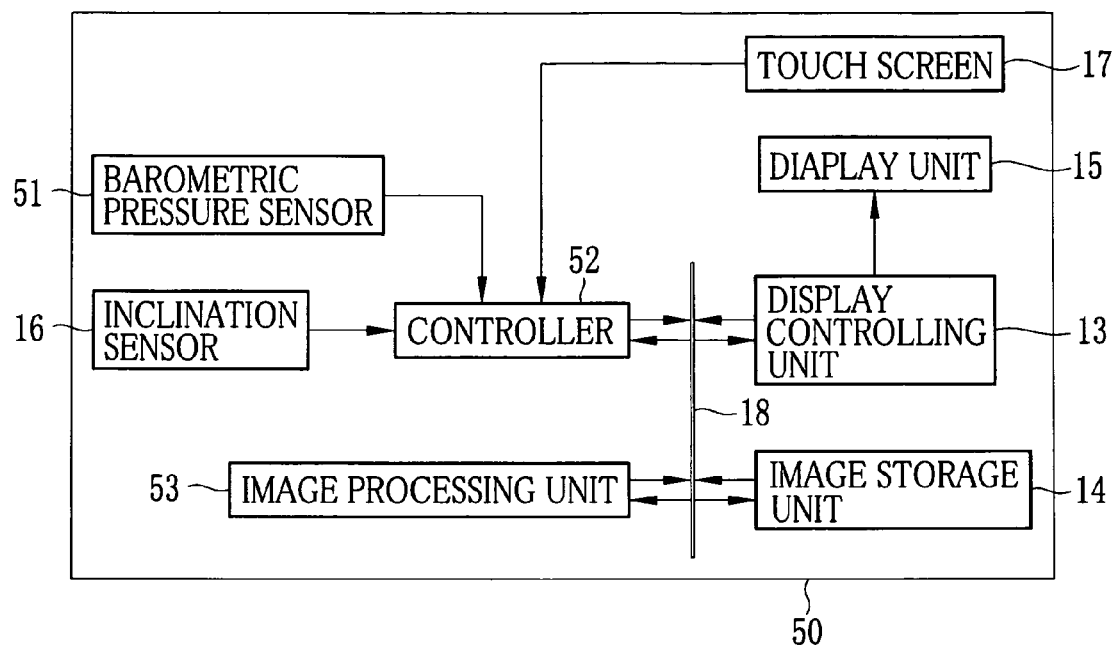
FIG. 22 is a functional block diagram illustrating a configuration of an image display apparatus including a barometric pressure sensor, other than an inclination sensor.

FIG. 22 illustrates a configuration of an image display apparatus 50 including a barometric pressure sensor as a unit of detecting a position of the image display apparatus in the vertical direction. Hereinafter, explanation will be made by giving the same reference numerals to the same portions as those of the present embodiment. Note that it is not necessary to limit the unit to the barometric pressure sensor, as long as it can detect the position of the image display apparatus 50 in the vertical direction. In this case, the inclination of the image display apparatus 50 is detected by the inclination sensor 16. Further, the position of the image display apparatus 50 in the vertical direction is detected by a barometric pressure sensor 51. From these sensors, detection signals are respectively output toward a controller 52.

The controller 52 calculates, based on these detection signals, an angle of inclination of the image display apparatus 50 and the position of the image display apparatus 50 in the z direction. Further, the calculated values are output to an image processing unit 53. The image processing unit 53 generates, by using the angle of inclination of the image display apparatus 50, the position of the image display apparatus 50 in the vertical direction, and the binocular disparity amount of human being, a three-dimensional image from a two-dimensional image read from the image storage unit 14. The generated three-dimensional image is output to the display controlling unit 13. Accordingly, the three-dimensional image generated by taking the inclination of the image display apparatus 50 and the position of the image display apparatus 50 in the vertical direction into consideration, is displayed on the display unit 15. Note that a depth range in the stereoscopic view display of the three-dimensional image is changed depending on the angle of inclination of the image display apparatus 50 and the position of the image display apparatus 50 in the vertical direction, which enables to allow the user to observe the stereoscopic view display of the three-dimensional image in an optimum state.

Note that although the three-dimensional image is generated by taking the angle of inclination of the image display apparatus 50 and the position of the image display apparatus 50 into consideration, there is no need to limit to this, and it is also possible to generate a three-dimensional image in which only the position of the image display apparatus 50 is taken into consideration.

In the present embodiment, the disparity amount in the three-dimensional image to be displayed on the image display apparatus is adjusted so that the perceptive aspect S in the stereoscopic view display in the image display apparatus is fixed even when the angle of inclination of the image display apparatus is changed, but, there is no need to limit to this, and it is also possible to design such that the disparity is changed in accordance with the position at which the user observes the image display apparatus.

Explanation will be made on a case where, for example, it is designed such that an intended image can be viewed at a position in front of an image display apparatus, and at a position deviated from the position in front of the image display apparatus, not the intended image but another image is displayed. Note that the image display apparatus will be described by giving a reference numeral 55 thereto, and description will be made by giving the same reference numerals to portions in the embodiment same as those of the present embodiment. Here, explanation will be made on a case where a lenticular method is used as a display method for the image display apparatus 55. Note that it is also possible to apply a case where a parallax barrier method is used as the display method for the image display apparatus 55.

Figure 23:
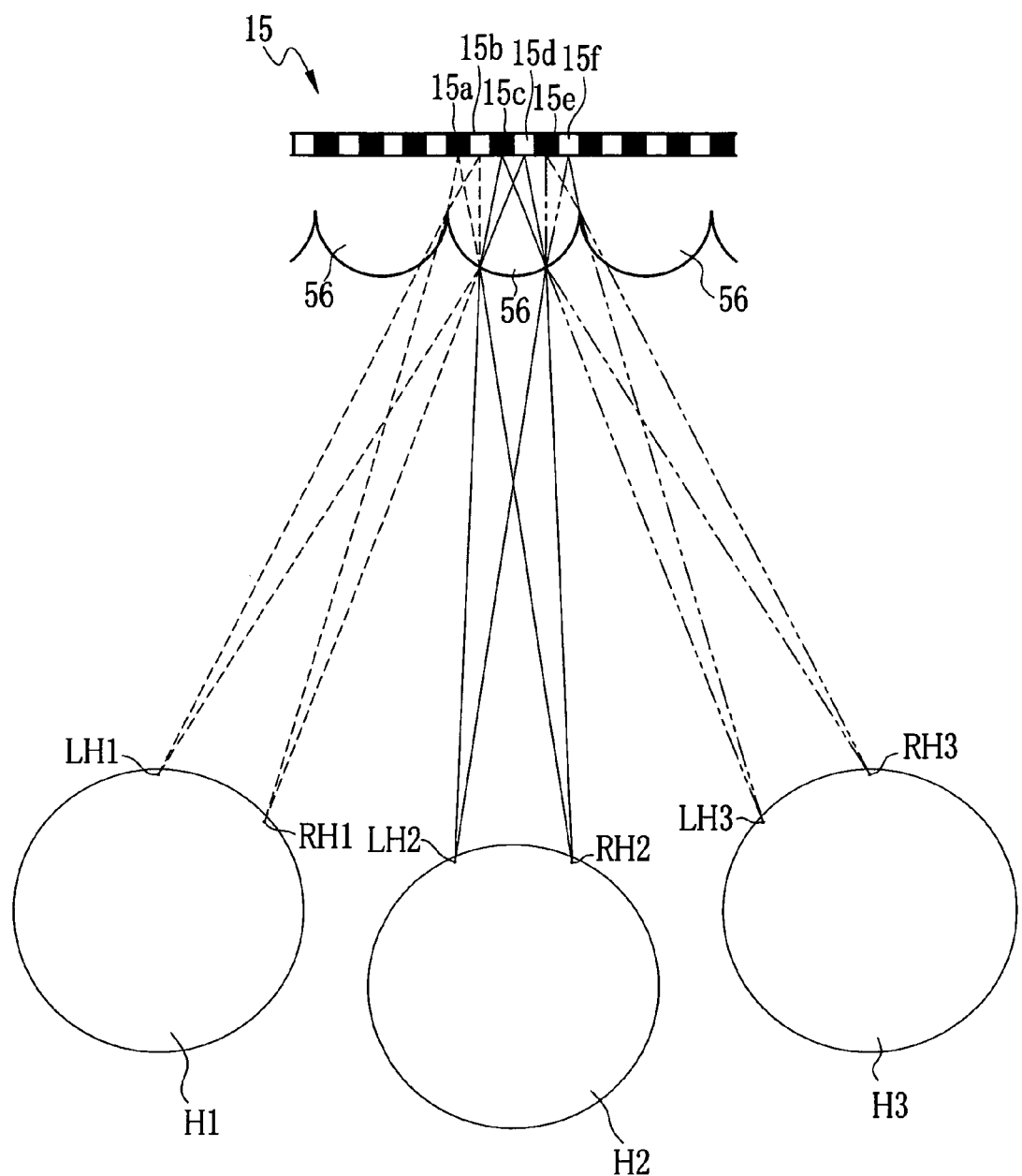
FIG. 23 is a diagram illustrating a relation between a display unit including lenticular lenses and positions of people.

As illustrated in FIG. 23, a plurality of lenticular lenses 56 are provided, to the display unit 15, in a lateral direction at a constant pitch. The display area of the display unit 15 is divided so that six display areas 15a to 15f correspond to one lenticular lens 56. Among these display areas, the display areas 15a, 15c, 15e are set to display areas for left eye, and the display areas 15b, 15d, 15f are set to display areas for right eye. Here, the display areas 15a, 15b are areas that display a part of an image A, the display areas 15c, 15d are areas that display a part of an image B, and the display areas 15e, 15f are areas that display a part of an image C. Note that there is no need to limit the number of display areas with respect to one lenticular lens to the above description, and the number is appropriately set.

When the display unit 15 with such a configuration is used, a left-eye image of the image A displayed on the display area 15a is refracted by the lenticular lens 56 to be observed by a left eye LH1 of a person H1 positioned on the left side in the drawing. Further, a right-eye image of the image A displayed on the display area 15b is refracted by the lenticular lens 56 to be observed by a right eye RH1 of the person H1 positioned on the left side in the drawing.

Further, regarding a left-eye image of the image B, the left-eye image of the image B displayed on the display area 15c is refracted by the lenticular lens 56 to be observed by a left eye LH2 of a person H2 positioned in front of the display unit 15. Further, a right-eye image of the image B displayed on the display area 15d is refracted by the lenticular lens 56 to be observed by a right eye RH2 of the person H2 positioned in front of the display unit 15.

Furthermore, a left-eye image of the image C displayed on the display area 15e is refracted by the lenticular lens 56 to be observed by a left eye LH3 of a person H3 positioned on the right side in the drawing with respect to the position in front of the display unit 15. Further, a right-eye image of the image C displayed on the display area 15f is refracted by the lenticular lens 56 to be observed by a right eye RH3 of the person H3 positioned on the right side in the drawing with respect to the position in front of the display unit 15.

Figure 24A:
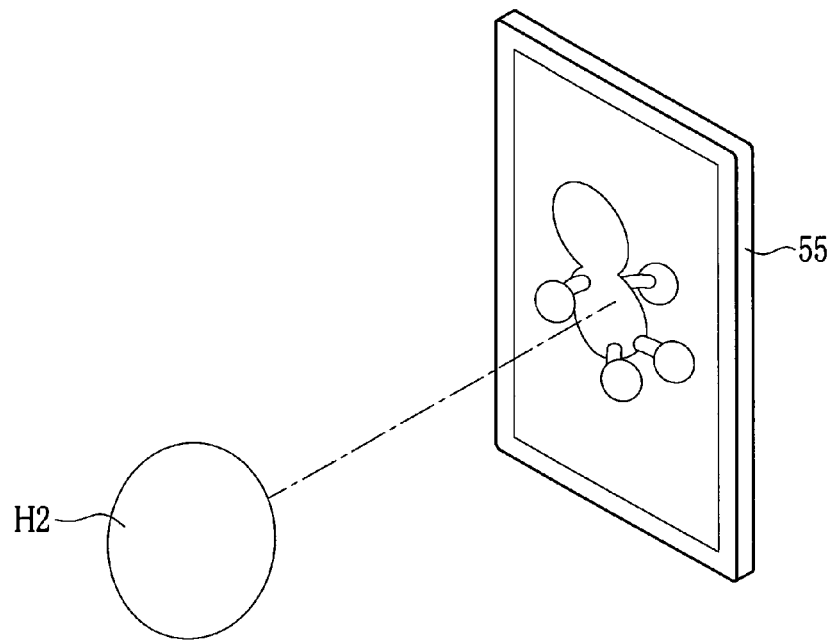
FIG. 24A is a diagram illustrating an image that is observed when the person is positioned in front of an image display apparatus when a plurality of images are simultaneously displayed in the image display apparatus.
Figure 24B:
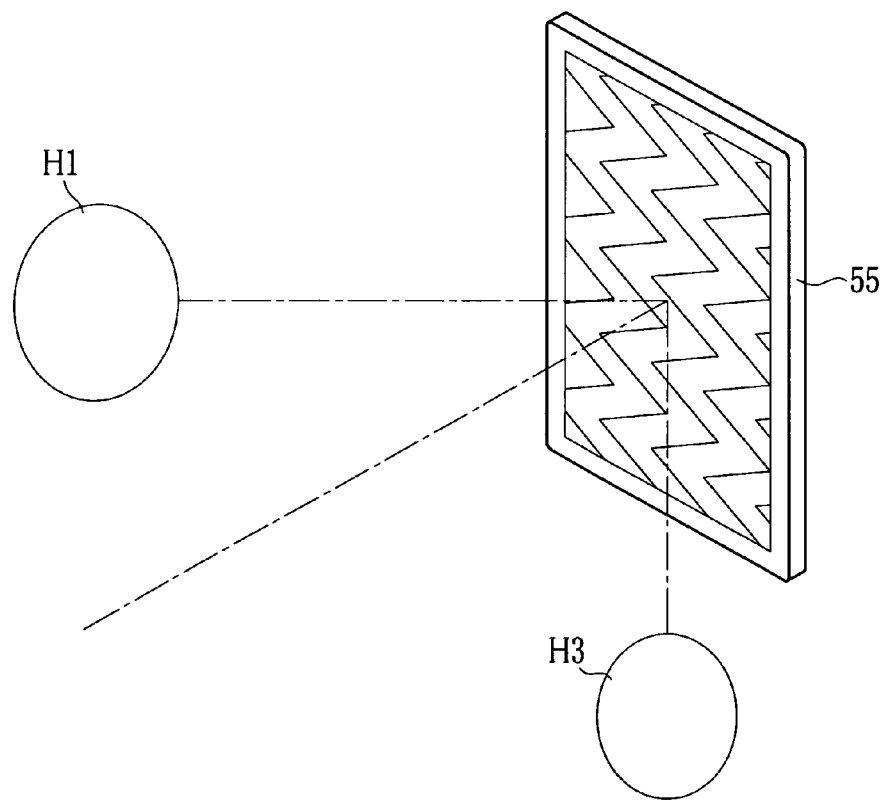
FIG. 24B is a diagram illustrating an image that is observed when the people are at positions deviated from the position in front of the image display apparatus.

When, there are displayed, on the display unit 15 of the image display apparatus 55, snow noise images as the image A and the image C, and an image of stuffed toy as the image B, the image capable of being observed changes depending on the position of person. As illustrated in FIG. 24A, the person H2 positioned in front of the image display apparatus can observe a stereoscopic view display of the image of stuffed toy being the image B. On the other hand, as illustrated in FIG. 24B, the person H1, the person H3 positioned on the left side or the right side with respect to the position in front of the image display apparatus cannot observe the stereoscopic view display of the image of stuffed toy, thereby observing the snow noise image. Accordingly, it is possible to prevent an image that the user wants to observe from being viewed by a person other than the user. Note that as images displayed as the image A and the image C, there can be cited appropriate images such as a blue image, a black image and a warning image that gives warning for the act of peeping, other than the snow noise image.

Figure 25A:
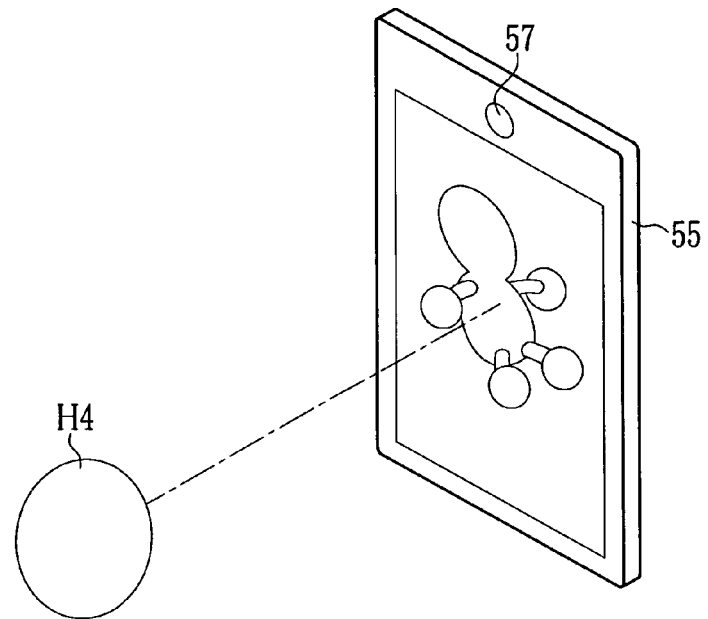
FIG. 25A is a diagram illustrating an image that is observed when a person is positioned in front of an image display apparatus at a time of changing a disparity amount of a displayed three-dimensional image.

Further, other than this, there can also be cited a method described below. For example, an imaging unit 57 is provided to the image display apparatus 55, and based on an image signal from the imaging unit 57, a position of person who observes the image display apparatus is specified. When it is determined, based on the image signal output from the imaging unit 57, that a person H4 is positioned in front of the image display apparatus 55, the image display apparatus 55 generates a three-dimensional image by using a disparity amount with which a stereoscopic view can be realized, and displays the image. In this case, as illustrated in FIG. 25A, the person H4 can observe the stereoscopic view display of the three-dimensional image such as the image of stuffed toy, for example.

Figure 25B:
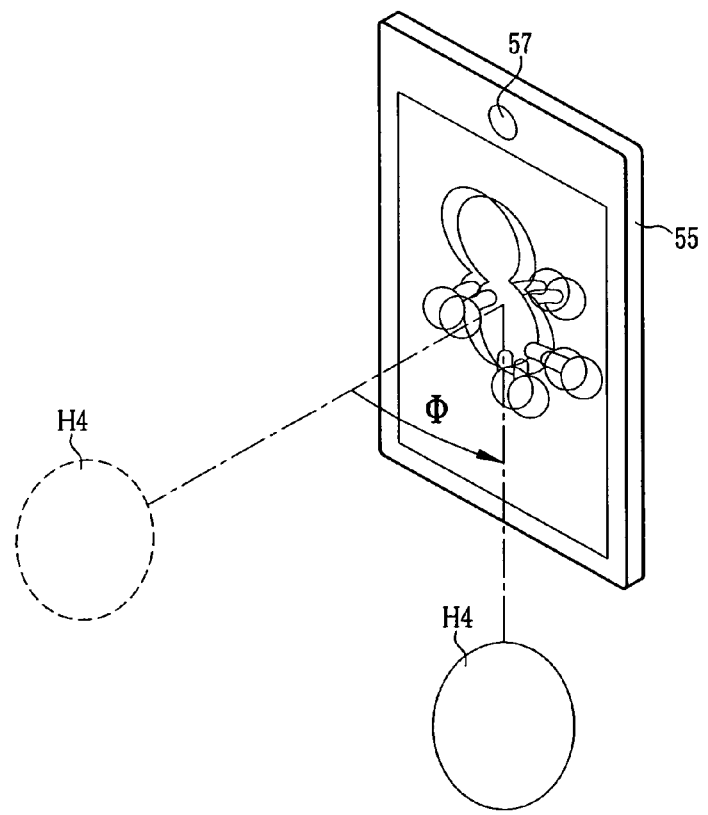
FIG. 25B is a diagram illustrating an image that is observed when the person is at a position deviated from the position in front of the image display apparatus.

Meanwhile, when the person is at a position deviated from the position in front of the image display apparatus 55, the image display apparatus 55 generates a three-dimensional image so that there is provided, not the disparity amount with which the stereoscopic view can be realized, but a disparity amount based on a determination result obtained by determining how much the position of observer is deviated from the position in front of the image display apparatus. As illustrated in FIG. 25B, when the person H4 is at a position (position indicated by a solid line) deviated by an angle φ from the position in front of the image display apparatus (position indicated by a dotted line), the image of stuffed toy is displayed, but, in this case, the disparity in the image of stuffed toy is not proper, namely, the person views a blurred image of stuffed toy. In this case, it is only required to generate the three-dimensional image so that the disparity amount becomes larger as an amount of deviation from the position in front of the image display apparatus 55 increases. Accordingly, it is possible to prevent an image that the user wants to observe from being viewed by a person other than the user.

Note that although the three-dimensional image is displayed to perform the stereoscopic view display, there is no need to limit to this, and it is also possible to display the two-dimensional image.

In the present embodiment, the image display apparatus is cited as an example, but, there is no need to limit to this, and it is possible to apply the present invention to an imaging apparatus including the aforementioned image display apparatus, a portable information, and communication device such as a portable telephone, a portable video game player, and the like. Hereinafter, explanation will be made by citing an imaging apparatus including a configuration of the image display apparatus of the present invention, as an example.

Figure 26:
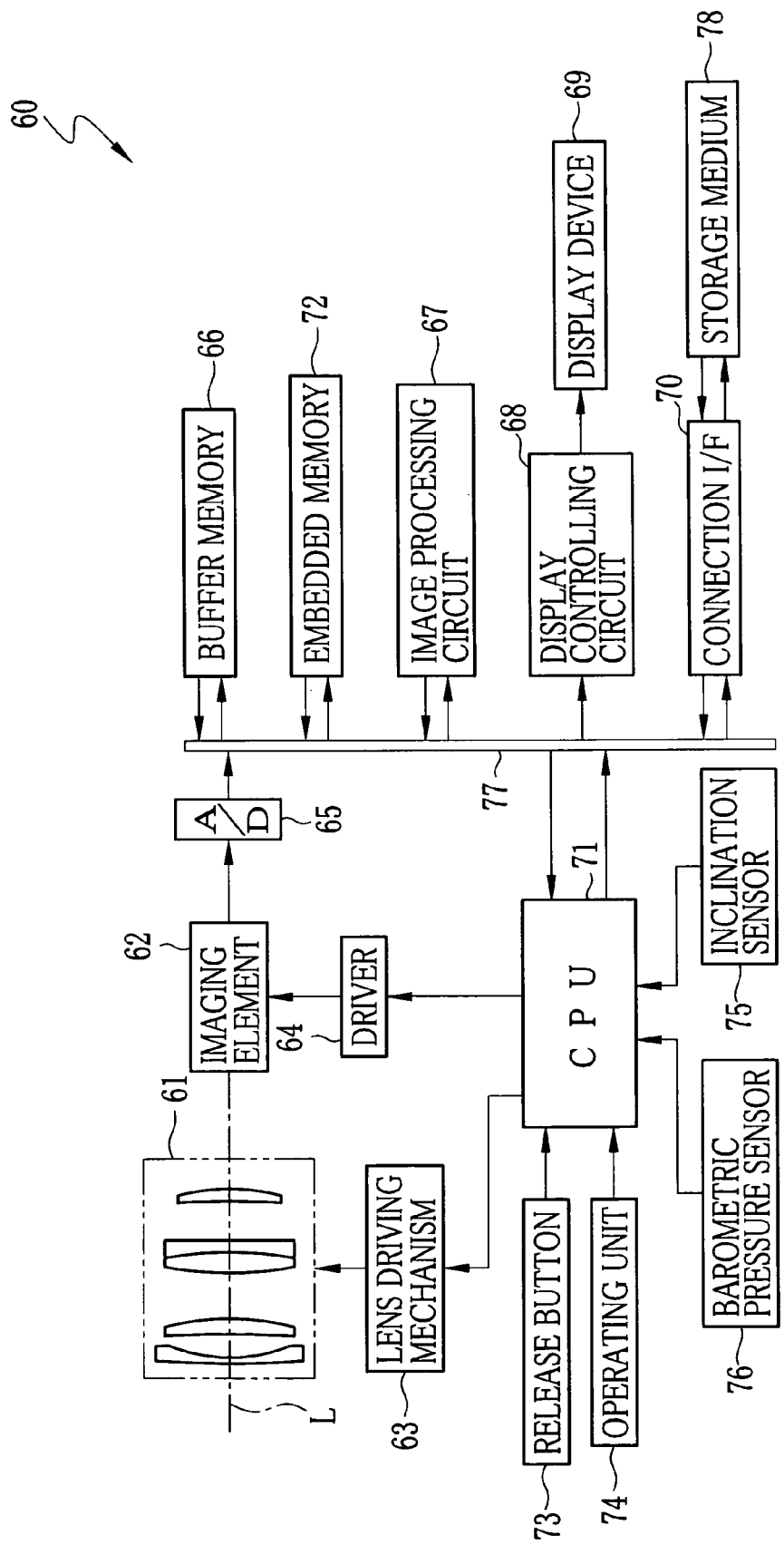
FIG. 26 is a functional block diagram illustrating an electrical configuration of an imaging apparatus that uses the image display apparatus of the present embodiment.

As illustrated in FIG. 26, an imaging apparatus 60 is formed of an imaging optical system 61, an imaging element 62, a lens driving mechanism 63, a driver 64, an A/D conversion unit 65, a buffer memory 66, an image processing circuit 67, a display controlling circuit 68, a display device 69, a connection I/F 70, a CPU 71, an embedded memory 72, a release button 73, an operating unit 74, an inclination sensor 75, a barometric pressure sensor 76, and the like. Note that the A/D conversion unit 65, the buffer memory 66, the image processing circuit 67, the display controlling circuit 68, the connection I/F 70, the CPU 71, and the embedded memory 72 are electrically connected via a bus 77.

The imaging apparatus 60 can make a storage medium 78 to be attached thereto via the connection I/F 70. As the storage medium 78, there can be used, other than a memory card, a small-sized hard disk, an optical disk such as a DVD or the like, for example, an external hard disk drive or the like, for instance, which is provided outside of the imaging apparatus 60.

The imaging optical system 61 is formed of a plurality of lenses, and forms a subject image on an imaging area of the imaging element 62. The imaging optical system 61 includes not-illustrated focus lens and zoom lens. The focus lens is driven to move forward/backward in an optical axis (L) direction by the lens driving mechanism 63, resulting in that focus adjustment in the imaging optical system 61 is performed. Further, the zoom lens is also driven to move forward/backward in the optical axis (L) direction by the lens driving mechanism 63, resulting in that zoom adjustment in the imaging optical system 61 is performed.

The imaging element 62 is formed of, for example, a CCD image sensor, a CMOS image sensor or the like. The driver 64 generates a driving signal at a predetermined timing in accordance with an instruction output from the CPU 71, and supplies the generated driving signal to the imaging element 62. In the imaging element 62, storage of charge (capturing of image) and reading of stored charge are controlled by the supplied driving signal. The CPU 71 determines information of brightness of subject by using photometric data of the subject, and decides, based on the information of brightness, a period of time of the storage of charge in the imaging element 62, an aperture in the imaging optical system 61, and an amplification of image signal output from the imaging element 62 or the like. The image signal read from the imaging element 62 is converted in the A/D conversion unit 65 from an analog image signal into a digital image signal, and is then written into the buffer memory 66.

The image processing circuit 67 performs image processing such as color interpolation, white balance and gamma conversion, on an input signal in accordance with an instruction from the CPU 71. Data as a result of performing this image processing corresponds to an image (image data). The image processing circuit 67 performs resolution conversion (pixel number conversion) processing necessary for displaying a reproduction image on the display device 69 on the image data, and outputs image data as a result of performing the resolution conversion processing to the display controlling circuit 68. Note that the image processing circuit 67 performs, at a time of performing digital zoom processing as well, the resolution (pixel number) conversion processing on the image data. Hereinafter, explanation will be made by referring to the image data as an image.

Note that when the three-dimensional image is displayed on the display device 69, the image processing circuit 67 performs the aforementioned processing, and in addition to that, it generates a three-dimensional image from a two-dimensional image temporarily stored in the buffer memory 66 by using an angle of inclination δ of the imaging apparatus 60 and a position of the imaging apparatus 60 in the vertical direction calculated by the CPU 71, and a binocular disparity amount of human being. Note that the image temporarily stored in the buffer memory 66 includes an image read from the storage medium 78, other than a through image obtained during a shooting standby state, and a still image and a moving image obtained at a time of performing shooting.

In accordance with an instruction from the CPU 71, the display controlling circuit 68 performs predetermined signal processing on an image input from the image processing circuit 67, and outputs the resultant to the display device 69. Note that as the display device 69, an LCD, an EL display, a CRT display or the like can be cited.

The release button 73 and the operating unit 74 output, when being operated, operation signals in accordance with operation contents to the CPU 71. When a release operation signal based on a pressing-down operation of the release button 73 is input, the CPU 71 performs generally-known contrast-type AF (auto-focus) operation by using a signal, out of image signals read from the imaging element 62, corresponding to a focus detection area previously set in an imaging screen.

The operating unit 74 includes a zoom operation part. When a zoom operation signal based on a zoom operation is input from the operating unit 74, the CPU 71 generates the aforementioned lens driving instruction, thereby making the zoom lens to be moved forward/backward by the lens driving mechanism 63. This enables to perform optical zoom adjustment in which a subject image formed on the imaging area of the imaging element 62 is enlarged or reduced. The embedded memory 72 stores a control program executed by the CPU 71, data used at the time of executing the control grogram, and the like.

The inclination sensor 75 is a sensor that detects an inclination of the imaging apparatus 60. A detection signal from the inclination sensor 75 is input into the CPU 71. The CPU 71 calculates an angle of inclination of the imaging apparatus 60 based on the detection signal from the inclination sensor 75.

The barometric pressure sensor 76 is a sensor that detects a position of the imaging apparatus 60 in the vertical direction. A detection signal from the barometric pressure sensor 76 is input into the CPU 71. The CPU 71 calculates the position of the imaging apparatus 60 in the vertical direction based on the detection signal from the barometric pressure sensor 76.

Explanation will be made on a case where a three-dimensional image is displayed on the display device 69 of the imaging apparatus 60, for example. The detection signals from the inclination sensor 75 and the barometric pressure sensor 76 are sequentially input into the CPU 71. Upon receiving the signals, the CPU 71 calculates the angle of inclination δ of the imaging apparatus 60 and the position of the imaging apparatus 60. Further, the calculated angle of inclination δ of the imaging apparatus 60 and position of the imaging apparatus 60 are output to the image processing circuit 67. The image processing circuit 67 generates the three-dimensional image from the image (two-dimensional image) temporarily stored in the buffer memory 66 by using the angle of inclination δ of the imaging apparatus 60, the position of the imaging apparatus 60, the binocular disparity amount of human being, and the like. Subsequently, the image processing circuit 67 outputs the generated three-dimensional image to the display controlling circuit 68. The display controlling circuit 68 outputs the three-dimensional image to the display device 69. Accordingly, the three-dimensional image is displayed on the display device 69.

Figure 27A:
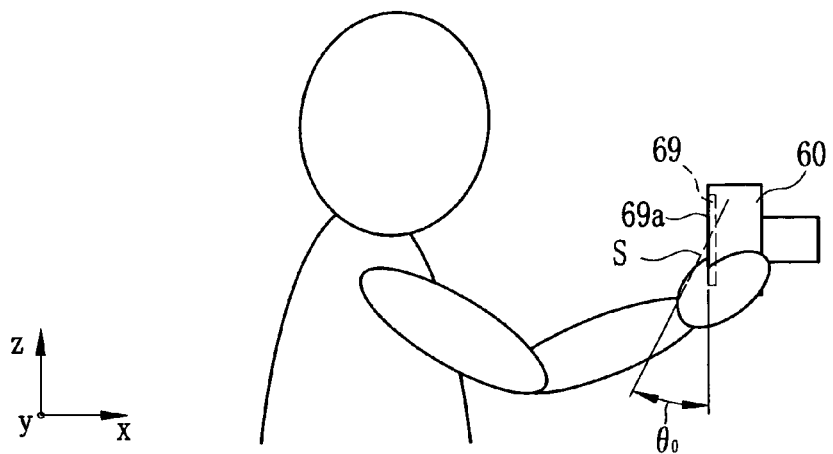
FIG. 27A is a diagram illustrating a case where, in a relation between a display surface of the imaging apparatus and a perceptive aspect, the display surface of the imaging apparatus becomes a surface parallel to a yz plane.

FIG. 27A illustrates a display surface 69a of the display device 69 of the imaging apparatus 60 and a perceptive aspect S of the stereoscopic-view-displayed three-dimensional image, when the display surface 69a is a surface parallel to a yz plane. An angle θ made by the display surface 69a and the perceptive aspect S of the stereoscopic-view-displayed three-dimensional image at this time is set as an angle $θ_0$.

Figure 27B:
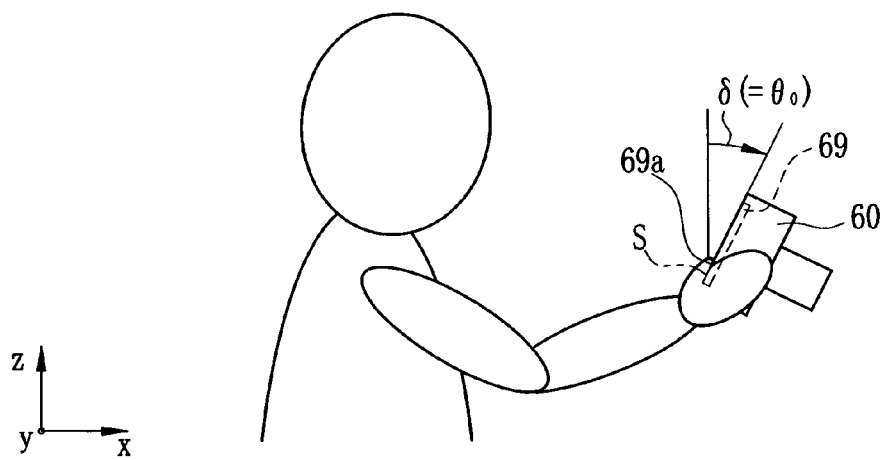
FIG. 27B is a diagram illustrating a case where, in a relation between the display surface of the imaging apparatus and the perceptive aspect, the imaging apparatus is inclined by an angle $\delta(=\theta_0)$.

FIG. 27B illustrates a case where the imaging apparatus 60 is inclined in the clockwise direction by an angle $δ(=θ_0)$ around an axis in the y direction as a rotation center. As described above, the three-dimensional image is generated so that the perceptive aspect S thereof becomes the perceptive aspect S of the three-dimensional image to be the reference (perceptive aspect S illustrated in FIG. 27A). Namely, when the angle of inclination δ of the imaging apparatus becomes the angle $θ_0$, the display surface 69a of the display device 69 and the perceptive aspect S of the three-dimensional image in the stereoscopic view display are in the same plane.

Figure 27C:
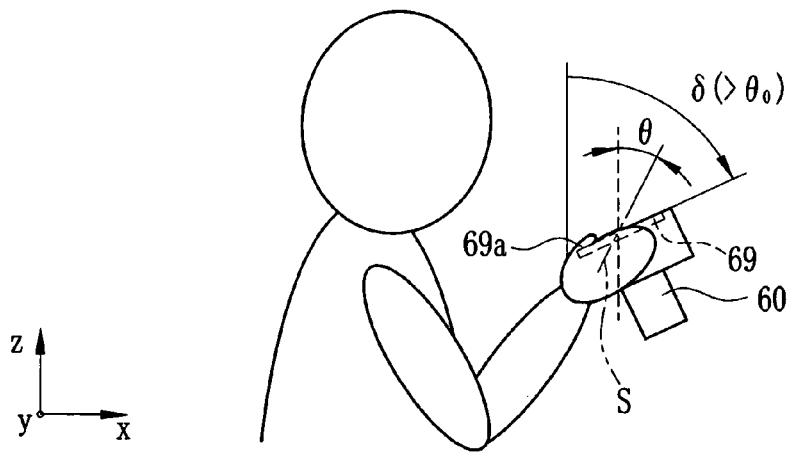
FIG. 27C is a diagram illustrating a case where, in a relation between the display surface of the imaging apparatus and the perceptive aspect, the imaging apparatus is inclined by an angle $\delta(>\theta_0)$.

FIG. 27C illustrates a case where the imaging apparatus 60 is inclined in the clockwise direction by an angle $δ(>θ_0)$ around an axis in the y direction as the rotation center. Also in this case, the three-dimensional image is generated so that the perceptive aspect S thereof becomes the perceptive aspect S of the three-dimensional image to be the reference (perceptive aspect S illustrated in FIG. 27A). Meanwhile, since the imaging apparatus 60 is inclined in the clockwise direction by the angle $δ(>θ_0)$, the perceptive aspect S of the stereoscopic-view-displayed three-dimensional image is in a state of being inclined by θ in the counterclockwise direction with respect to the display surface 69a of the display device 69.

As described above, the perceptive aspect S of the stereoscopic-view-displayed three-dimensional image is fixed, regardless of the angle δ by which the imaging apparatus 60 is inclined. Specifically, it is possible to change a depth range in the stereoscopic view display of the three-dimensional image depending on the angle δ by which the imaging apparatus 60 is inclined. Accordingly, it becomes possible to allow the user to observe the stereoscopic view display of the three-dimensional image in an optimum state.

Figure 28A:
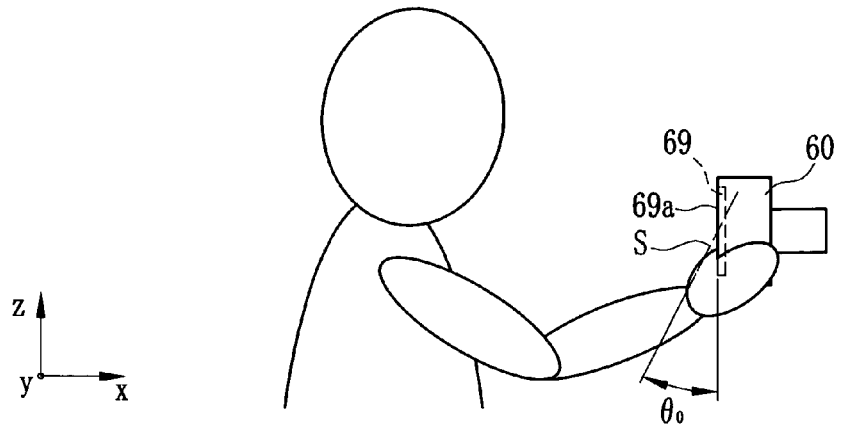
FIG. 28A is a diagram illustrating a case where, in a relation between the display surface of the imaging apparatus and the perceptive aspect, the display surface of the imaging apparatus becomes a surface parallel to the yz plane.

Further, there is considered a case where the imaging apparatus 60 is moved in an upper direction (z direction) without being inclined. Hereinafter, a case where the display surface 69a of the display device 69 of the imaging apparatus 60 is a surface parallel to the yz plane, is considered. When a position of the imaging apparatus 60 illustrated in FIG. 28A is set as a reference, at this position, the perceptive aspect S of the stereoscopic-view-displayed three-dimensional image is in a state of being inclined by an angle θ in the clockwise direction with respect to the display surface 69a of the display device 69.

Figure 28B:
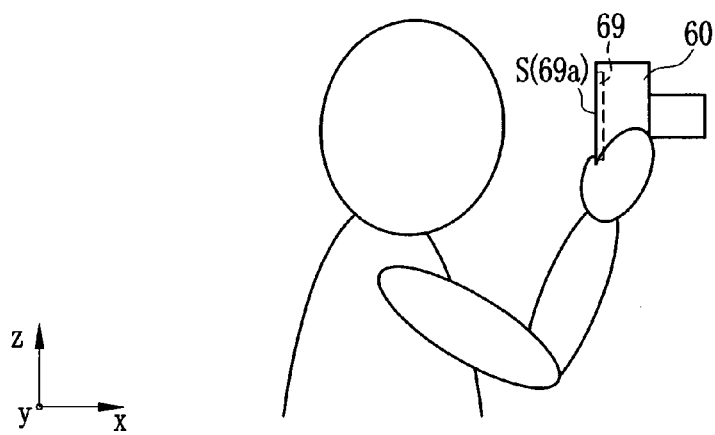
FIG. 28B is a diagram illustrating a case where, in a relation between the display surface of the imaging apparatus and the perceptive aspect, the imaging apparatus is moved in a z direction.
Figure 28C:
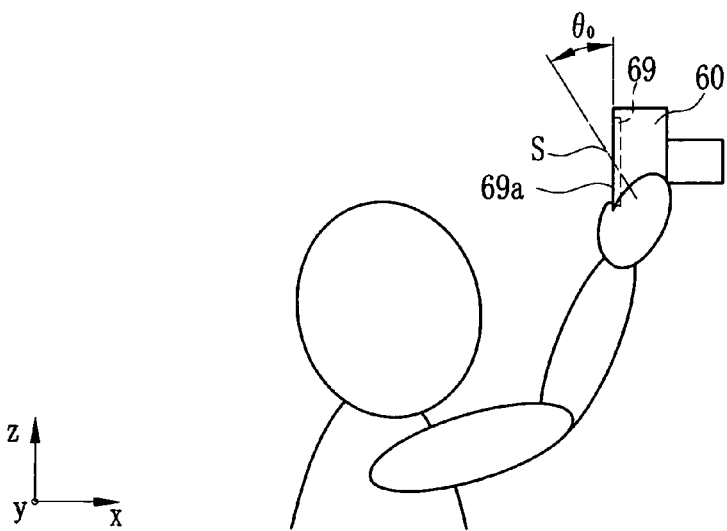
FIG. 28C is a diagram illustrating a case where the imaging apparatus is further moved in the z direction from the state of FIG. 28B.

As illustrated in FIG. 28B, when the imaging apparatus 60 is moved in the z direction by a predetermined amount from the position to be the reference, the state is changed to a state where the display surface 69a of the display device 69 and the perceptive aspect S of the stereoscopic-view-displayed three-dimensional image are in the same plane. As illustrated in FIG. 28C, when the imaging apparatus 60 is further moved in the z direction, the state is changed to a state where the perceptive aspect S of the stereoscopic-view-displayed three-dimensional image is inclined by an angle θ in the counterclockwise direction with respect to the display surface 69a of the display device 60. Namely, only by moving the imaging apparatus 69 in the z direction, the depth range of the perceptive aspect S of the stereoscopic-view-displayed three-dimensional image is changed. Also in this case, it becomes possible to allow the user to observe the stereoscopic view display of the three-dimensional image in an optimum state.

Note that in FIG. 27 and FIG. 28, the depth range in the stereoscopic view display is changed in accordance with either the angle of inclination of the imaging apparatus 60 or the position of the imaging apparatus in the vertical direction, but, there is no need to limit to this, and it is also possible to change the depth range in the stereoscopic view display by taking both of the angle of inclination of the imaging apparatus and the position of the imaging apparatus in the vertical direction into consideration. Note that in this case, regarding the direction of inclination of the imaging apparatus, it is also possible to set an axis in the z direction as the rotation center, or to set a straight line included in the yz plane as the rotation center, other than the case where the axis in the y direction is set as the rotation center.

Further, it is also possible that there is provided, in addition to the above-described configuration, an imaging unit capturing an image of user to the imaging apparatus, a distance from a face of the user to the imaging apparatus is determined from an image captured by the imaging unit, and a three-dimensional image is generated by taking the determined distance, other than the angle of inclination of the imaging apparatus, the position of the imaging apparatus in the vertical direction, and the binocular disparity amount of human being, into consideration.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image display apparatus, comprising:
   a display unit capable of performing a stereoscopic view display of a first image utilizing a disparity of a human being;
   an inclination detecting unit detecting an angle of inclination of the image display apparatus when the image display apparatus held in a horizontal state is inclined;
   an image processing unit performing, on the first image, processing which changes a depth range in the stereoscopic view display of the first image using the angle of inclination of the image display apparatus detected by the inclination detecting unit when the image display apparatus held in the horizontal state is inclined from the horizontal state; and a display controlling unit making the display unit display the first image on which the processing is performed by the image processing unit, wherein when an aspect by which the first image is perceived in the stereoscopic view display is set to a perceptive aspect, the perceptive aspect in the stereoscopic view display of the first image, when the image display apparatus is held in the horizontal state, is inclined by a predetermined angle with respect to a display surface of the display unit, and regardless of the angle of inclination of the image display apparatus, the perceptive aspect in the stereoscopic view display of the first image, when the image display apparatus is declined from the horizontal state, is held in a state inclined by the predetermined angle with respect to the display surface of the display unit in the horizontal state.

2. The image display apparatus according to claim 1, further comprising:
a first determining unit determining whether or not the angle of inclination of the image display apparatus detected by the inclination detecting unit is equal to or less than a previously set threshold value, wherein
when the first determining unit determines the angle of inclination of the image display apparatus detected by the inclination detecting unit is equal to or less than the threshold value, the image processing unit changes the depth range in the stereoscopic view display of the first image using the angle of inclination of the image display apparatus detected by the inclination detecting unit.

3. The image display apparatus according to claim 2, wherein when the first determining unit determines the angle of inclination of the image display apparatus detected by the inclination detecting unit exceeds the threshold value, the image processing unit sets the angle of inclination of the image display apparatus to the threshold value and changes the depth range in the stereoscopic view display of the first image.

4. The image display apparatus according to claim 2, further comprising:
a calculating unit calculating a degree of visual angle in the image display apparatus being inclined, when the first determining unit determines the angle of inclination of the image display apparatus detected by the inclination detecting unit is equal to or less than the threshold value; and
a second determining unit determining whether or not the degree of the visual angle calculated by the calculating unit is included in a range of a fusional limit, wherein the image processing unit changes the depth range in the stereoscopic view display of the first image using the degree of visual angle in addition to the angle of inclination of the image display apparatus.

5. The image display apparatus according to claim 1, further comprising an operating unit that is operated at a time of adjusting the predetermined angle, wherein the image processing unit performs the processing that changes the depth range in the stereoscopic view display of the first image so that the predetermined angle becomes an angle adjusted by the operation of the operating unit.

6. The image display apparatus according to claim 5, further comprising a storage unit storing the adjusted predetermined angle by the operation of the operating unit, wherein the image processing unit performs the processing that changes the depth range in the stereoscopic view display of the first image so to be the predetermined angle stored by the storage unit.

7. The image display apparatus according to claim 1, further comprising a position detecting unit detecting a position at which a person touched in the display surface, wherein
the image processing unit reduces the first image based on the position of the person detected in the position detecting unit, and
the display unit displays the first image being reduced by the image processing unit.

8. The image display apparatus according to claim 1, wherein the image processing unit adjusts a width of the first image based on the changed depth range.

9. The image display apparatus according to claim 1, wherein the first image is displayed using an entire area of the display unit.

10. The image display apparatus according to claim 1, wherein the first image is displayed using a part of an area of the display unit.

11. The image display apparatus according to claim 1, wherein the image processing unit performs the processing that changes the depth range in the stereoscopic view display on an area of a construction included in the first image.

12. The image display apparatus according to claim 1, wherein the image processing unit performs, when an area with which an input operation is performed is included in the first image, the processing that changes the depth range in the stereoscopic view display on at least an area other than the area with which the input operation is performed.

13. The image display apparatus according to claim 1, wherein the image processing unit changes, when a construction being displayed in the stereoscopic view display is included in the first image, the depth range in the first image while maintaining the depth range in the construction by performing the processing that changes the depth range in the stereoscopic view display.

14. The image display apparatus according to claim 1, further comprising a detecting unit detecting a touch of a person, wherein the image processing unit performs the processing that changes the depth range in the stereoscopic view display of the first image based on a presence or an absence of the touch of the person detected by the detecting unit.

15. The image display apparatus according to claim 14, wherein the display controlling unit stops the stereoscopic view display of the first image by the display unit, when the touch of the person cannot be detected by the detecting unit.

16. The image display apparatus according to claim 1, further comprising an imaging unit capturing a second image, which is different from the first image, wherein the image processing unit performs the processing that changes the depth range in the stereoscopic view display of the first image based on a position of a face of a person included in the second image captured by the imaging unit.

17. The image display apparatus according to claim 16, wherein the display controlling unit stops the stereoscopic view display of the first image by the display unit, when the face of the person cannot be detected from the second image captured by the imaging unit.

18. The image display apparatus according to claim 16, wherein
the imaging unit can obtain the second image in which the perceptive aspect in the stereoscopic view display of the first image is set as a shooting range, and the image display apparatus further comprises:
- a determining unit determining whether or not an operating unit is operated based on a position of a hand of the person included in the second image captured by the imaging unit and a position of the operating unit included in the stereoscopic view display; and
- a controlling unit performing, when the determining unit determines that the operating unit is operated, control based on the operation of the operating unit.

19. The image display apparatus according to claim 18, wherein the shooting range in the imaging unit is formed of an area among the perceptive aspect in the stereoscopic view display of the first image, the area projecting forward from a display surface of the display unit.

20. The image display apparatus according to claim 1, further comprising:
- a touch screen with which an input operation is performed; and
- a sensitivity changing unit changing a detection sensitivity in the touch screen based on the depth range in the stereoscopic view display being changed by the image processing unit.

21. The image display apparatus according to claim 20, further comprising one of a blower module blowing wind toward an object by which the input operation is performed and a jetting module jetting drops of water toward the object by which the input operation is performed when the performance of the input operation through the touch screen is detected.

22. The image display apparatus according to claim 1, further comprising a height detecting unit detecting a height at which the apparatus is positioned, wherein the image processing unit performs the processing which changes the depth range in the stereoscopic view display of the first image based on the height at which the apparatus is positioned detected by the height detecting unit.

23. An image display apparatus, comprising:
- a display unit capable of performing a stereoscopic view display of a first image utilizing a disparity of a human being;
- an inclination detecting unit detecting an angle of inclination of the image display apparatus when the image display apparatus held in a horizontal state is inclined;
- an image processing unit performing, on the first image, processing that changes a depth range in the stereoscopic view display of the first image using the angle of inclination of the image display apparatus detected by the inclination detecting unit, when the image display apparatus held in a horizontal state is inclined; and
- a display controlling unit making the display unit display the first image on which the processing is performed by the image processing unit, wherein
    - when an aspect by which the first image is perceived in the stereoscopic view display is set to a perceptive aspect, the perceptive aspect in the stereoscopic view display of the first image, when the image display apparatus is held in the horizontal state, is inclined by a predetermined angle with respect to a display surface of the display unit, and
    - regardless of the angle of inclination of the image display apparatus, the perceptive aspect in the stereoscopic view display of the first image, when the image display apparatus is declined from the horizontal state, is held in a state inclined by the predetermined angle with respect to the display surface of the display unit in the horizontal state in which the predetermined angle is changed by performing the processing by the image processing unit, and
    - the image processing unit sets, based on a position at which a person touches, the perceptive aspect in the stereoscopic view display of the first image as a position of a rotation center used when making to incline by the predetermined angle.

24. The image display apparatus according to claim 23, wherein the perceptive aspect in the stereoscopic view display of the first image becomes the display surface of the display unit when a binocular disparity amount of a human being who observes the first image is out of a range of a fusional limit in the stereoscopic view display.

25. The image display apparatus according to claim 23, wherein the perceptive aspect in the stereoscopic view display of the first image becomes the display surface of the display unit when the predetermined angle exceeds a previously set threshold value.

26. The image display apparatus according to claim 23, wherein the image processing unit sets, when the person touches at a plurality of positions at a same time, a straight line passing through an intermediate position of the plurality of positions as the rotation center used when making the perceptive aspect in the stereoscopic view display of the first image to incline by the predetermined angle.

27. The image display apparatus according to claim 23, wherein the image processing unit sets, when the person touches at a plurality of positions at a same time, a straight line passing through any position out of the plurality of positions as the rotation center used when making the perceptive aspect in the stereoscopic view display of the first image to incline by the predetermined angle.

28. An image display apparatus, comprising:
- a display unit capable of performing a stereoscopic view display of a first image utilizing a disparity of a human being;
- an inclination detecting unit detecting an angle of inclination of the image display apparatus, when the image display apparatus held in a horizontal state is inclined;
- an image processing unit performing, on the first image, processing that changes a depth range in the stereoscopic view display of the first image using the angle of inclination of the image display apparatus detected by the inclination detecting unit, when the image display apparatus held at the horizontal state is inclined from the horizontal state;
- a display controlling unit making the display unit display the first image on which the processing is performed by the image processing unit, and
- a detecting unit detecting a touch of a person, wherein
    - when an aspect by which the first image is perceived in the stereoscopic view display is set to a perceptive aspect, the perceived aspect is formed of one of a curved surface and a bending surface in which a depth range in a peripheral edge portion of the display unit is set to be less than a depth range in a center portion of the display unit, and
    - when the touch of the person is detected by the detecting unit, a depth range of the perceived aspect of the first image in a vicinity of a position at which the touch of the person is detected is set to zero (0).

29. The image display apparatus according to claim 28, wherein the depth range in the center portion of the display unit is changed in accordance with a movement of the position of the touch of the person detected by the detecting unit.

30. An imaging apparatus, comprising the image display apparatus according to claim 1.

31. An imaging apparatus, comprising the image display apparatus according to claim 23.

32. An imaging apparatus, comprising the image display apparatus according to claim 28.

* * * * *